(12) United States Patent
Brotzell et al.

(10) Patent No.: US 8,110,741 B2
(45) Date of Patent: *Feb. 7, 2012

(54) COMPOSITE COILED TUBING END CONNECTOR

(75) Inventors: Arthur D. Brotzell, Calgary (CA); Stewart H. Fowler, Spring, TX (US); Chanthol Tho, Attleboro, MA (US)

(73) Assignee: Fiberspar Corporation, New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/356,278

(22) Filed: Jan. 20, 2009

(65) Prior Publication Data

US 2009/0278348 A1 Nov. 12, 2009

Related U.S. Application Data

(63) Continuation of application No. 10/442,680, filed on May 21, 2003, now Pat. No. 7,498,509, which is a continuation-in-part of application No. 09/678,577, filed on Oct. 3, 2000, now abandoned, which is a continuation-in-part of application No. 09/410,605, filed on Oct. 1, 1999, now abandoned, which is a continuation-in-part of application No. 09/368,333, filed on Aug. 3, 1999, now abandoned, which is a continuation of application No. 08/721,135, filed on Sep. 26, 1996, now Pat. No. 5,988,702.

(60) Provisional application No. 60/005,377, filed on Sep. 28, 1995, provisional application No. 60/157,614, filed on Oct. 4, 1999.

(51) Int. Cl.
 *H02G 15/24* (2006.01)

(52) U.S. Cl. .................................................. 174/21 R
(58) Field of Classification Search ................ 174/21 R, 174/74 R, 19, 21 JS; 285/249
See application file for complete search history.

(56) References Cited

U.S. PATENT DOCUMENTS 87,993 A 3/1869 Weston
(Continued)

FOREIGN PATENT DOCUMENTS

BE 559688 8/1957
(Continued)

OTHER PUBLICATIONS

International Search Report mailed on Jan. 22, 2001.
(Continued)

*Primary Examiner* — Chau Nguyen
(74) *Attorney, Agent, or Firm* — Goodwin Procter LLP

(57) ABSTRACT

Connectors for attaching a composite pipe to a service member are described herein. In one embodiment, a connector can include a service end, a slip nut, a slip, a seal carrier, and an energy conductor. The slip nut can be disposed about the outer surface of the pipe and can be engaged by the service end. The slip can be positioned about the outer surface of the pipe and can be engaged by the service end and the slip nut to compress the slip into gripping contact with the pipe. The seal carrier can be positioned in a bore of the pipe at a location radially opposite the slip to resist deformation of the pipe when the slip is compressed into gripping contact with the pipe. The energy conductor can be embedded within and surrounded by a material of the service end for connection with an energy conductor within the composite pipe.

19 Claims, 18 Drawing Sheets

U.S. PATENT DOCUMENTS

| | | | |
|---|---|---|---|
| 396,176 A | 1/1889 | Simpson |
| 418,906 A | 1/1890 | Bosworth |
| 482,181 A | 9/1892 | Kellom |
| 646,887 A | 4/1900 | Stowe et al. |
| 749,633 A | 1/1904 | Seeley |
| 1,234,812 A | 7/1917 | Simmmons |
| 1,793,455 A | 2/1931 | Buchanan |
| 1,890,290 A | 12/1932 | Hargreaves |
| 1,930,285 A | 10/1933 | Robinson |
| 2,464,416 A | 3/1949 | Raybould |
| 2,467,520 A | 4/1949 | Brubaker |
| 2,481,001 A | 9/1949 | Burckle |
| 2,624,366 A | 1/1953 | Pugh |
| 2,648,720 A | 8/1953 | Alexander |
| 2,690,769 A | 10/1954 | Brown |
| 2,725,713 A | 12/1955 | Blanchard |
| 2,750,569 A | 6/1956 | Moon |
| 2,810,424 A | 10/1957 | Swartswelter et al. |
| 2,973,975 A | 3/1961 | Ramberg et al. |
| 2,991,093 A | 7/1961 | Guarnaschelli |
| 3,086,369 A | 4/1963 | Brown |
| 3,116,760 A | 1/1964 | Matthews |
| 3,170,137 A | 2/1965 | Brandt |
| 3,277,231 A | 10/1966 | Downey et al. |
| 3,306,637 A | 2/1967 | Press et al. |
| 3,334,663 A | 8/1967 | Peterson |
| 3,379,220 A | 4/1968 | Kiuchi et al. |
| 3,390,704 A | 7/1968 | Woodell |
| 3,477,474 A | 11/1969 | Mesler |
| 3,507,412 A | 4/1970 | Carter |
| 3,522,413 A | 8/1970 | Chrow |
| 3,554,284 A | 1/1971 | Nystrom |
| 3,579,402 A | 5/1971 | Goldsworthy et al. |
| 3,589,135 A | 6/1971 | Ede et al. |
| 3,589,752 A | 6/1971 | Spencer et al. |
| 3,604,461 A | 9/1971 | Matthews |
| 3,606,396 A | 9/1971 | Prosdocimo et al. |
| 3,606,402 A | 9/1971 | Medney |
| 3,677,978 A | 7/1972 | Dowbenko et al. |
| 3,685,860 A | 8/1972 | Schmidt |
| 3,692,601 A | 9/1972 | Goldsworthy et al. |
| 3,696,332 A * | 10/1972 | Dickson et al. ............ 340/855.1 |
| 3,700,519 A | 10/1972 | Carter |
| 3,701,489 A | 10/1972 | Goldsworthy et al. |
| 3,728,187 A | 4/1973 | Martin |
| 3,730,229 A | 5/1973 | D'Onofrio |
| 3,734,421 A | 5/1973 | Karlson et al. |
| 3,738,637 A | 6/1973 | Goldsworthy et al. |
| 3,740,285 A | 6/1973 | Goldsworthy at al. |
| 3,744,016 A | 7/1973 | Davis |
| 3,769,127 A | 10/1973 | Goldsworthy et al. |
| 3,773,090 A | 11/1973 | Ghersa et al. |
| 3,776,805 A | 12/1973 | Hansen |
| 3,783,060 A | 1/1974 | Goldsworthy at al. |
| 3,814,138 A | 6/1974 | Courtot |
| 3,817,288 A | 6/1974 | Ball |
| 3,828,112 A | 8/1974 | Johansen et al. |
| 3,856,052 A | 12/1974 | Feucht |
| 3,860,040 A | 1/1975 | Sullivan |
| 3,860,742 A | 1/1975 | Medney |
| 3,901,281 A | 8/1975 | Morrisey |
| 3,907,335 A | 9/1975 | Burge et al. |
| 3,913,624 A | 10/1975 | Ball |
| 3,933,180 A | 1/1976 | Carter |
| 3,956,051 A | 5/1976 | Carter |
| 3,957,410 A | 5/1976 | Goldsworthy et al. |
| 3,960,629 A | 6/1976 | Goldsworthy |
| 3,974,862 A | 8/1976 | Fuhrmann et al. |
| 3,980,325 A | 9/1976 | Robertson |
| RE29,112 E | 1/1977 | Carter |
| 4,032,177 A | 6/1977 | Anderson |
| 4,048,807 A | 9/1977 | Ellers et al. |
| 4,053,343 A | 10/1977 | Carter |
| 4,057,610 A | 11/1977 | Goettler et al. |
| 4,095,865 A | 6/1978 | Denison et al. |
| 4,108,701 A | 8/1978 | Stanley |
| 4,111,469 A | 9/1978 | Kavick |
| 4,114,393 A | 9/1978 | Engle, Jr. et al. |
| 4,125,423 A | 11/1978 | Goldsworthy |
| 4,133,972 A | 1/1979 | Andersson et al. |
| 4,137,949 A | 2/1979 | Linko, III et al. |
| 4,139,025 A | 2/1979 | Carlstrom et al. |
| 4,190,088 A | 2/1980 | Lalikos et al. |
| 4,200,126 A | 4/1980 | Fish |
| 4,220,381 A | 9/1980 | van der Graaf et al. |
| 4,226,446 A | 10/1980 | Burrington |
| 4,241,763 A | 12/1980 | Antal et al. |
| 4,248,062 A | 2/1981 | McLain et al. |
| 4,261,390 A | 4/1981 | Belofsky |
| 4,273,160 A | 6/1981 | Lowles |
| 4,303,263 A | 12/1981 | Legris |
| 4,303,457 A | 12/1981 | Johansen et al. |
| 4,306,591 A | 12/1981 | Arterburn |
| 4,308,999 A | 1/1982 | Carter |
| 4,336,415 A | 6/1982 | Walling |
| 4,351,364 A | 9/1982 | Cocks et al. |
| 4,380,252 A | 4/1983 | Gray et al. |
| 4,402,346 A | 9/1983 | Cheetham et al. |
| 4,422,801 A | 12/1983 | Hale et al. |
| 4,445,734 A | 5/1984 | Cunningham |
| 4,446,892 A | 5/1984 | Maxwell et al. |
| 4,447,378 A | 5/1984 | Gray et al. |
| 4,463,779 A | 8/1984 | Wink et al. |
| 4,488,577 A | 12/1984 | Shilad et al. |
| 4,507,019 A | 3/1985 | Thompson |
| 4,515,737 A | 5/1985 | Karino et al. |
| 4,522,058 A | 6/1985 | Ewing |
| 4,522,235 A | 6/1985 | Kluss et al. |
| 4,530,379 A | 7/1985 | Policelli |
| 4,556,340 A | 12/1985 | Morton |
| 4,567,916 A | 2/1986 | Antal et al. |
| 4,578,675 A | 3/1986 | MacLeod |
| 4,606,378 A | 8/1986 | Meyer et al. |
| 4,627,472 A | 12/1986 | Goettler et al. |
| 4,657,795 A | 4/1987 | Foret et al. |
| 4,681,169 A | 7/1987 | Brookbank, III |
| 4,700,751 A | 10/1987 | Fedrick |
| 4,712,813 A | 12/1987 | Passerell et al. |
| 4,728,224 A | 3/1988 | Salama et al. |
| 4,741,795 A | 5/1988 | Grace et al. |
| 4,758,455 A | 7/1988 | Campbell et al. |
| 4,789,007 A | 12/1988 | Cretel et al. |
| 4,842,024 A | 6/1989 | Palinchak |
| 4,844,516 A | 7/1989 | Baker |
| 4,849,668 A | 7/1989 | Crawley et al. |
| 4,859,024 A | 8/1989 | Rahman |
| 4,903,735 A | 2/1990 | Delacour et al. |
| 4,913,657 A | 4/1990 | Naito et al. |
| 4,936,618 A | 6/1990 | Sampa et al. |
| 4,941,774 A | 7/1990 | Harmstorf et al. |
| 4,942,903 A | 7/1990 | Jacobsen et al. |
| 4,972,880 A | 11/1990 | Strand |
| 4,992,787 A | 2/1991 | Helm |
| 4,995,761 A | 2/1991 | Barton |
| 5,048,572 A | 9/1991 | Levine |
| 5,077,107 A | 12/1991 | Kaneda et al. |
| 5,090,741 A | 2/1992 | Yokomatsu et al. |
| 5,097,870 A | 3/1992 | Williams |
| 5,156,206 A | 10/1992 | Cox |
| 5,170,011 A | 12/1992 | Martucci |
| 5,172,765 A | 12/1992 | Sas-Jaworsky et al. |
| 5,176,180 A | 1/1993 | Williams et al. |
| 5,182,779 A | 1/1993 | D'Agostino et al. |
| 5,184,682 A | 2/1993 | Delacour et al. |
| 5,188,872 A | 2/1993 | Quigley |
| 5,209,136 A | 5/1993 | Williams |
| 5,222,769 A | 6/1993 | Kaempen |
| 5,261,462 A | 11/1993 | Wolfe et al. |
| 5,265,648 A | 11/1993 | Lyon |
| 5,285,008 A | 2/1994 | Sas-Jaworsky et al. |
| 5,285,204 A | 2/1994 | Sas-Jaworsky |
| 5,330,807 A | 7/1994 | Williams |
| 5,332,269 A | 7/1994 | Homm |
| 5,334,801 A | 8/1994 | Mohn et al. |
| 5,346,658 A | 9/1994 | Gargiulo |
| 5,348,088 A | 9/1994 | Laflin et al. |
| 5,348,096 A | 9/1994 | Williams |

| | | |
|---|---|---|
| 5,351,752 A | 10/1994 | Wood et al. |
| RE34,780 E | 11/1994 | Trenconsky et al. |
| 5,364,130 A | 11/1994 | Thalmann |
| 5,394,488 A | 2/1995 | Fernald et al. |
| 5,395,913 A | 3/1995 | Bottcher et al. |
| 5,398,729 A | 3/1995 | Spurgat |
| 5,416,724 A | 5/1995 | Savic |
| 5,426,297 A | 6/1995 | Dunphy et al. |
| 5,428,706 A | 6/1995 | Lequeux et al. |
| 5,435,867 A | 7/1995 | Wolfe et al. |
| 5,437,311 A | 8/1995 | Reynolds |
| 5,443,099 A | 8/1995 | Chaussepied et al. |
| 5,452,923 A | 9/1995 | Smith |
| RE35,081 E | 11/1995 | Quigley |
| 5,469,916 A | 11/1995 | Sas-Jaworsky et al. |
| 5,472,764 A | 12/1995 | Kehr et al. |
| 5,499,661 A | 3/1996 | Odru et al. |
| 5,524,937 A | 6/1996 | Sides, III et al. |
| 5,525,698 A | 6/1996 | Bottcher et al. |
| 5,538,513 A | 7/1996 | Okajima et al. |
| 5,551,484 A | 9/1996 | Charboneau |
| 5,558,375 A * | 9/1996 | Newman .................. 285/23 |
| 5,622,211 A | 4/1997 | Martin et al. |
| 5,641,956 A | 6/1997 | Vengsarkar et al. |
| 5,671,811 A | 9/1997 | Head et al. |
| 5,683,204 A | 11/1997 | Lawther et al. |
| 5,730,188 A | 3/1998 | Kalman et al. |
| 5,755,266 A | 5/1998 | Aanonsen et al. |
| 5,758,990 A | 6/1998 | Davies et al. |
| 5,795,102 A | 8/1998 | Corbishley et al. |
| 5,797,702 A | 8/1998 | Drost et al. |
| 5,798,155 A | 8/1998 | Yanagawa et al. |
| 5,804,268 A | 9/1998 | Mukawa et al. |
| 5,828,003 A | 10/1998 | Thomeer et al. |
| 5,875,792 A | 3/1999 | Campbell, Jr. et al. |
| 5,908,049 A | 6/1999 | Williams et al. |
| 5,913,337 A | 6/1999 | Williams et al. |
| 5,921,285 A | 7/1999 | Quigley et al. |
| 5,933,945 A | 8/1999 | Thomeer et al. |
| 5,950,651 A | 9/1999 | Kenworthy et al. |
| 5,951,812 A | 9/1999 | Gilchrist, Jr. |
| 5,984,581 A | 11/1999 | McGill et al. |
| 5,988,702 A | 11/1999 | Sas-Jaworsky |
| 6,004,639 A | 12/1999 | Quigley et al. |
| 6,016,845 A | 1/2000 | Quigley et al. |
| 6,032,699 A | 3/2000 | Cochran et al. |
| 6,066,377 A | 5/2000 | Tonyali et al. |
| 6,093,752 A | 7/2000 | Park et al. |
| 6,136,216 A | 10/2000 | Fidler et al. |
| 6,148,866 A | 11/2000 | Quigley et al. |
| 6,209,587 B1 | 4/2001 | Hsich et al. |
| 6,220,079 B1 | 4/2001 | Taylor et al. |
| 6,286,558 B1 | 9/2001 | Quigley et al. |
| 6,315,002 B1 | 11/2001 | Antal et al. |
| 6,328,075 B1 | 12/2001 | Furuta et al. |
| 6,334,466 B1 | 1/2002 | Jani et al. |
| 6,357,485 B2 | 3/2002 | Quigley et al. |
| 6,357,966 B1 | 3/2002 | Thompson et al. |
| 6,361,299 B1 | 3/2002 | Quigley et al. |
| 6,372,861 B1 | 4/2002 | Schillgalies et al. |
| 6,390,140 B2 | 5/2002 | Niki et al. |
| 6,402,430 B1 | 6/2002 | Guesnon et al. |
| 6,422,269 B1 | 7/2002 | Johansson et al. |
| 6,461,079 B1 | 10/2002 | Beaujean et al. |
| 6,470,915 B1 | 10/2002 | Enders et al. |
| 6,532,994 B1 | 3/2003 | Enders et al. |
| 6,604,550 B2 | 8/2003 | Quigley et al. |
| 6,631,743 B2 | 10/2003 | Enders et al. |
| 6,634,387 B1 | 10/2003 | Glejbøl et al. |
| 6,634,388 B1 | 10/2003 | Taylor et al. |
| 6,663,453 B2 | 12/2003 | Quigley et al. |
| 6,706,348 B2 | 3/2004 | Quigley et al. |
| 6,764,365 B2 | 7/2004 | Quigley et al. |
| 6,807,989 B2 | 10/2004 | Enders et al. |
| 6,857,452 B2 | 2/2005 | Quigley et al. |
| 6,902,205 B2 | 6/2005 | Bouey et al. |
| 6,978,804 B2 | 12/2005 | Quigley et al. |
| 6,983,766 B2 | 1/2006 | Baron et al. |
| 7,029,356 B2 | 4/2006 | Quigley et al. |
| 7,080,667 B2 | 7/2006 | McIntyre et al. |
| 7,152,632 B2 | 12/2006 | Quigley et al. |
| 7,234,410 B2 | 6/2007 | Quigley et al. |
| 7,243,716 B2 | 7/2007 | Denniel et al. |
| 7,285,333 B2 | 10/2007 | Wideman et al. |
| 7,498,509 B2 | 3/2009 | Brotzell et al. |
| 2001/0006712 A1 | 7/2001 | Hibino et al. |
| 2002/0119271 A1 | 8/2002 | Quigley et al. |
| 2002/0185188 A1 | 12/2002 | Quigley et al. |
| 2004/0096614 A1 | 5/2004 | Quigley et al. |
| 2005/0189029 A1 | 9/2005 | Quigley et al. |
| 2007/0125439 A1 | 6/2007 | Quigley et al. |
| 2007/0154269 A1 | 7/2007 | Quigley et al. |
| 2008/0006337 A1 | 1/2008 | Quigley et al. |
| 2008/0006338 A1 | 1/2008 | Wideman et al. |
| 2008/0014812 A1 | 1/2008 | Quigley et al. |
| 2008/0185042 A1 | 8/2008 | Feechan et al. |
| 2008/0210329 A1 | 9/2008 | Quigley et al. |
| 2009/0107558 A1 | 4/2009 | Quigley et al. |
| 2009/0278348 A1 | 11/2009 | Brotzell et al. |

FOREIGN PATENT DOCUMENTS

| | | |
|---|---|---|
| CH | 461199 | 8/1968 |
| DE | 1959738 | 6/1971 |
| DE | 3603597 | 8/1987 |
| DE | 4040400 A1 | 8/1992 |
| DE | 4214383 C1 | 9/1993 |
| EP | 0024512 | 3/1981 |
| EP | 0203887 | 12/1986 |
| EP | 352148 | 1/1990 |
| EP | 0427306 | 5/1991 |
| EP | 0503737 | 9/1992 |
| EP | 505815 A2 | 9/1992 |
| EP | 0536844 | 4/1993 |
| EP | 0681085 | 11/1995 |
| EP | 0854029 A2 | 7/1998 |
| EP | 0953724 | 11/1999 |
| EP | 0970980 | 1/2000 |
| EP | 0981992 A1 | 3/2000 |
| FR | 989204 | 9/1951 |
| GB | 553110 | 5/1943 |
| GB | 809097 | 2/1959 |
| GB | 909187 | 10/1962 |
| GB | 956500 | 4/1964 |
| GB | 1297250 | 11/1972 |
| GB | 2103744 | 2/1983 |
| GB | 2193006 A | 1/1988 |
| GB | 2255994 A | 11/1992 |
| GB | 2270099 A | 3/1994 |
| GB | 2365096 | 2/2002 |
| JP | 163 592 | 6/1990 |
| WO | WO-87/04768 | 8/1987 |
| WO | WO-91/13925 | 9/1991 |
| WO | WO-92/21908 | 12/1992 |
| WO | WO-9307073 A1 | 4/1993 |
| WO | WO-9319927 | 10/1993 |
| WO | WO-95/02782 | 1/1995 |
| WO | WO-97/12115 | 4/1997 |
| WO | WO-99/19653 | 4/1999 |
| WO | WO-0031458 A1 | 6/2000 |

OTHER PUBLICATIONS

International Search Report mailed on Mar. 5, 2001.
International Search Report mailed on Nov. 8, 2005.
Austigard E. and R. Tomter ; "Composites Subsea: Cost Effective Products; an Industry Challenge ", Subsea 94 International Conference, the 1994 Report on Subsea Engineering: The Continuing Challenges.
Connell Mike et al.; "Coiled Tubing: Application for Today's Challenges", Petroleum Engineer International, pp. 18-21 (Jul. 1999).
Feechan Mike et al.; "Spoolable Composites Show Promise", The American Oil & Gas Reporter, pp. 44-50 (Sep. 1999).
Fowler Hampton et al.; "Development Update and Applications of an Advanced Composite Spoolable Tubing", Offshore Technology Conference held in Houston Texas from May 4 to 7, 1998, pp. 157-162.
Fowler Hampton; "Advanced Composite Tubing Usable", The American Oil & Gas Reporter, pp. 76-81 (Sep. 1997).

Hahn H. Thomas and Williams G. Jerry; "Compression Failure Mechanisms in Unidirectional Composites". NASA Technical Memorandum pp. 1-42 (Aug. 1984).

Hansen et al.; "Qualification and Verification of Spoolable High Pressure Composite Service Lines for the Asgard Field Development Project", paper presented at the 1997 Offshore Technology Conference held in Houston Texas from May 5 to 8, 1997, pp. 45-54.

Hartman, D.R., et al., "High Strength Glass Fibers," Owens Corning Technical Paper (Jul. 1996).

Haug et al.; "Dynamic Umbilical with Composite Tube (DUCT)", Paper presented at the 1998 Offshore Technology Conference held in Houston Texas from 4th to 7th, 1998; pp. 699-712.

Lundberg et al.; "Spin-off Technologies from Development of Continuous Composite Tubing Manufacturing Process", Paper presented at the 1998 Offshore Technology Conference held in Houston, Texas from May 4 to 7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5 to 6, 2000, pp. 1-9.

Measures et al.; "Fiber Optic Sensors for Smart Structures", Optics and Lasers Engineering 16: 127-152 (1992).

Measures R. M.; "Smart Structures with Nerves of Glass". Prog. Aerospace Sci. 26(4): 289-351 (1989).

Moe Wood T. et al.; "Spoolable, Composite Piping for Chemical and Water Injection and Hydraulic Valve Operation", Proceedings of the 11th International Conference on Offshore Mechanics and Arctic Engineering-1992-, vol. III, Part A—Materials Engineering, pp. 199-207 (1992).

Poper Peter; "Braiding", International Encyclopedia of Composites, Published by VGH, Publishers, Inc., 220 East 23rd Street, Suite 909, New York, NY I0010.

Quigley et al.; "Development and Application of a Novel Coiled Tubing String for Concentric Workover Services", Paper presented at the 1997 Offshore Technology Conference held in Houston, Texas from May 5 to 8, 1997, pp. 189-202.

Rispler K. et al.; "Composite Coiled Tubing in Harsh Completion/Workover Environments", Paper presented at the SPE GAS Technology Symposium and Exhibition held in Calgary, Alberta, Canada, on Mar. 15-18, 1998, pp. 405-410.

Sas-Jaworsky II Alex.; "Developments Position CT for Future Prominence", The American Oil & Gas Reporter, pp. 87-92 (Mar. 1996).

Sas-Jaworsky II and Bell Steve "Innovative Applications Stimulate Coiled Tubing Development", World Oil, 217(6): 61 (Jun. 1996).

Sas-Jaworsky II and Mark Elliot Teel; "Coiled Tubing 1995 Update: Production Applications", World Oil, 216(6): 97 (Jun. 1995).

Sas-Jaworsky, A. and J.G. Williams, "Advanced composites enhance coiled tubing capabilities", World Oil, pp. 57-69 (Apr. 1994).

Sas-Jaworsky, A. and J.G. Williams, "Development of a composite coiled tubing for oilfield services", Society of Petroleum Engineers, SPE 26536, pp. 1-11 (1993).

Sas-Jaworsky, A. and J.G. Williams, "Enabling capabilities and potential applications of composite coiled tubing", Proceedings of World Oil's 2nd Intemtional Conference on Coiled Tubing Technology, pp. 2-9 (1994).

Shuart J. M. et al.; "Compression Behavior of ≠45o-Dominated Laminates with a Circular Hole or Impact Damage", AIAA Journal 24(1):115-122 (Jan. 1986).

Silverman A. Seth; "Spoolable Composite Pipe for Offshore Applications", Materials Selection & Design pp. 48-50 (Jan. 1997).

Williams G. J. et al.; "Composite Spoolable Pipe Development, Advancements, and Limitations", Paper presented at the 2000 Offshore Technology Conference held in Houston Texas from May 1 to 4, 2000, pp. 1-16.

Williams, J.G., "Oil Industry Experiences with Fiberglass Components," Offshore Technology Conference, 1987, pp. 211-220.

* cited by examiner

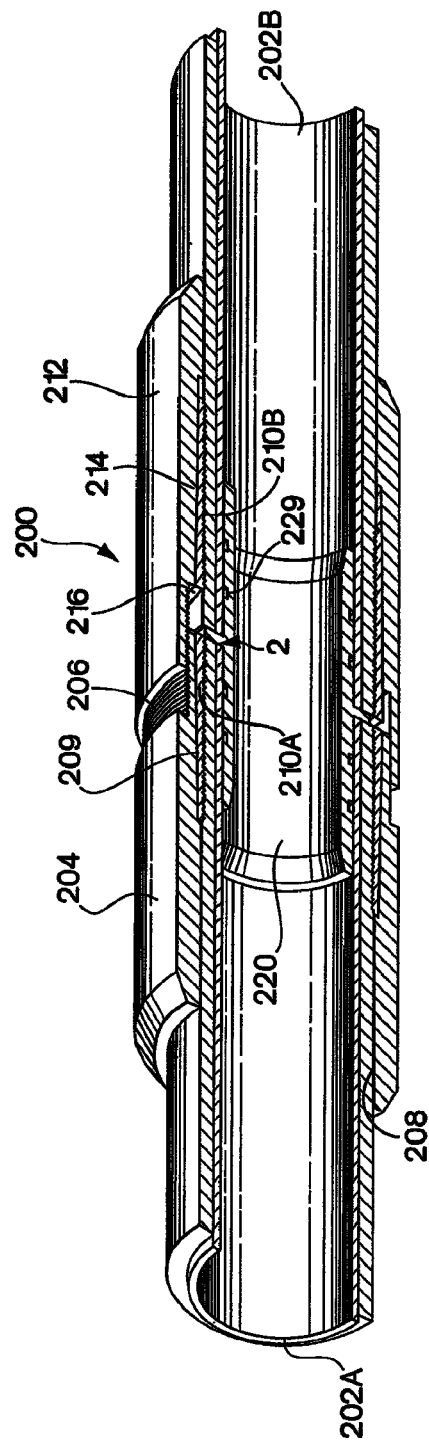
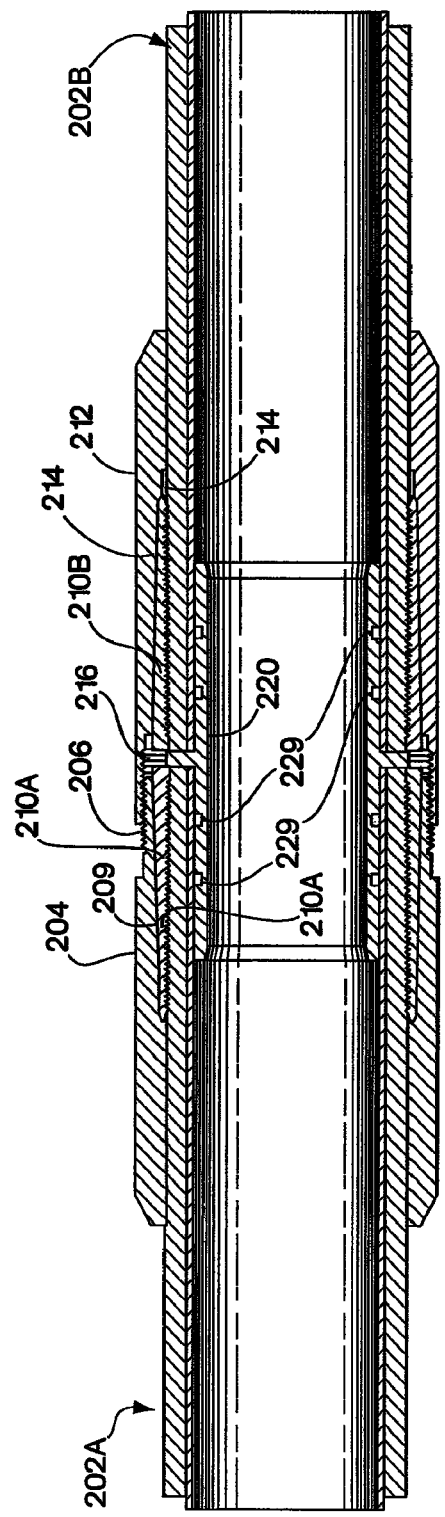
Fig. 11
Fig. 12

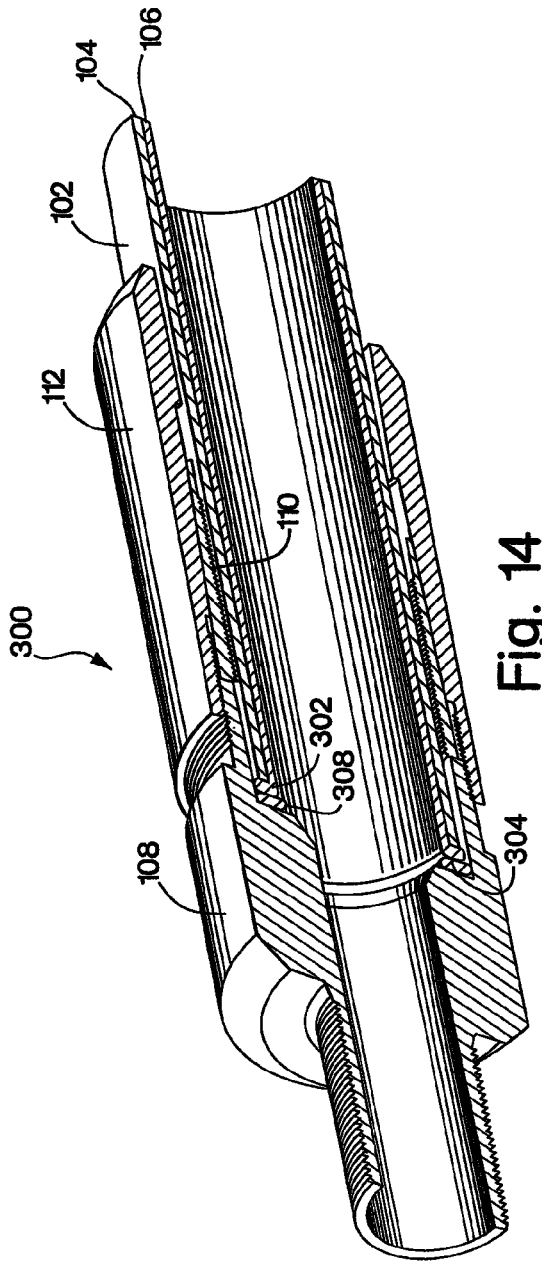
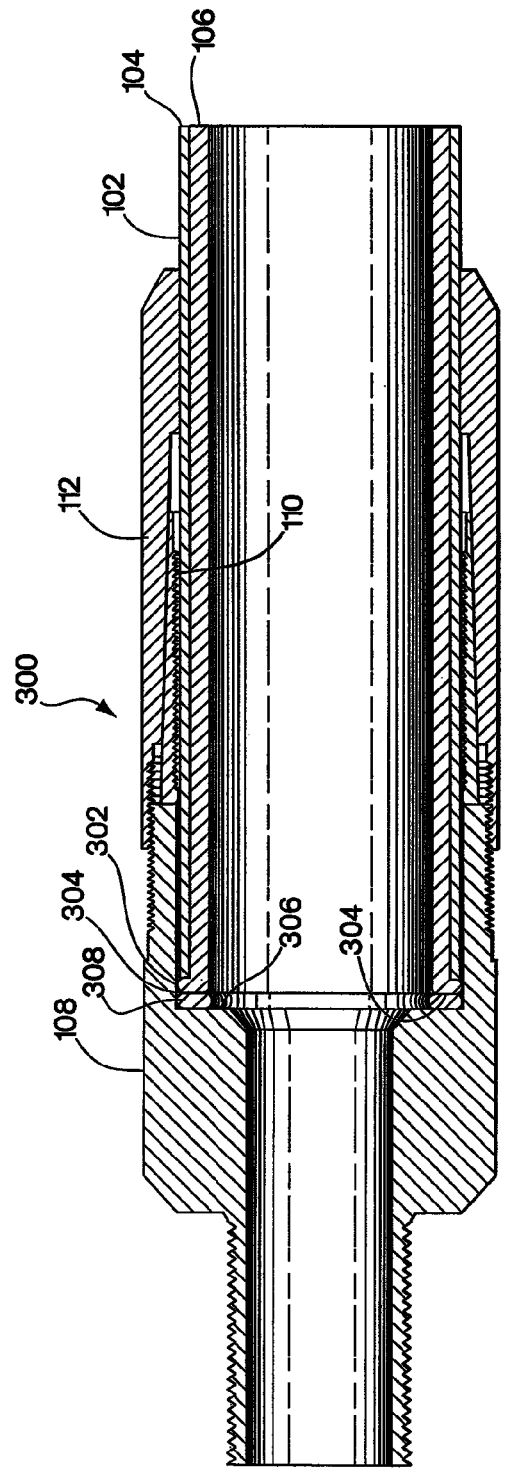

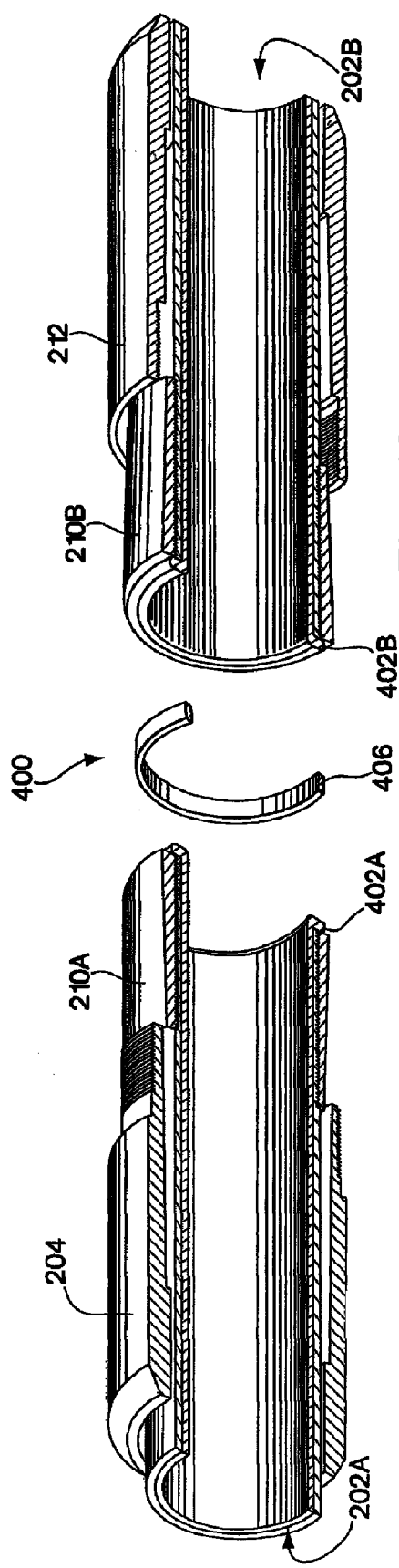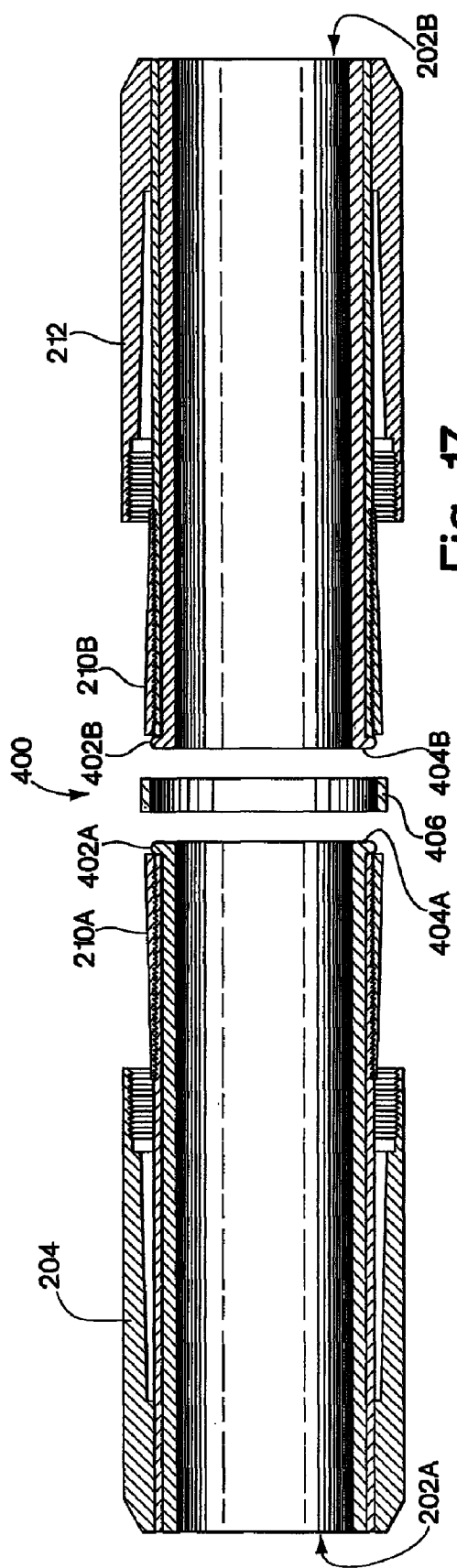
Fig. 16
Fig. 17

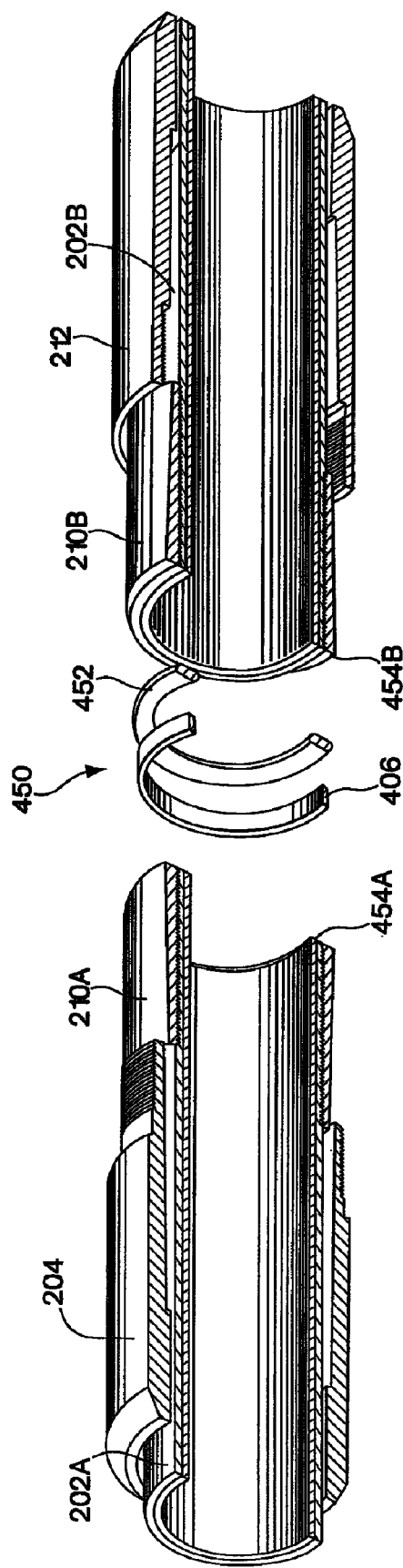
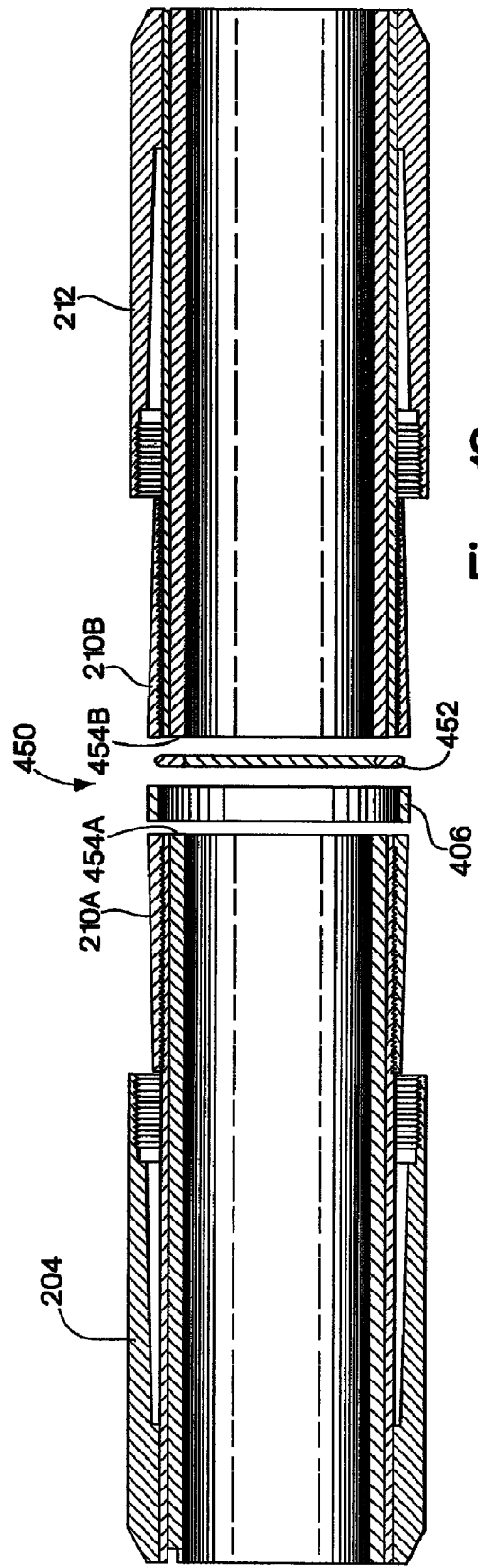

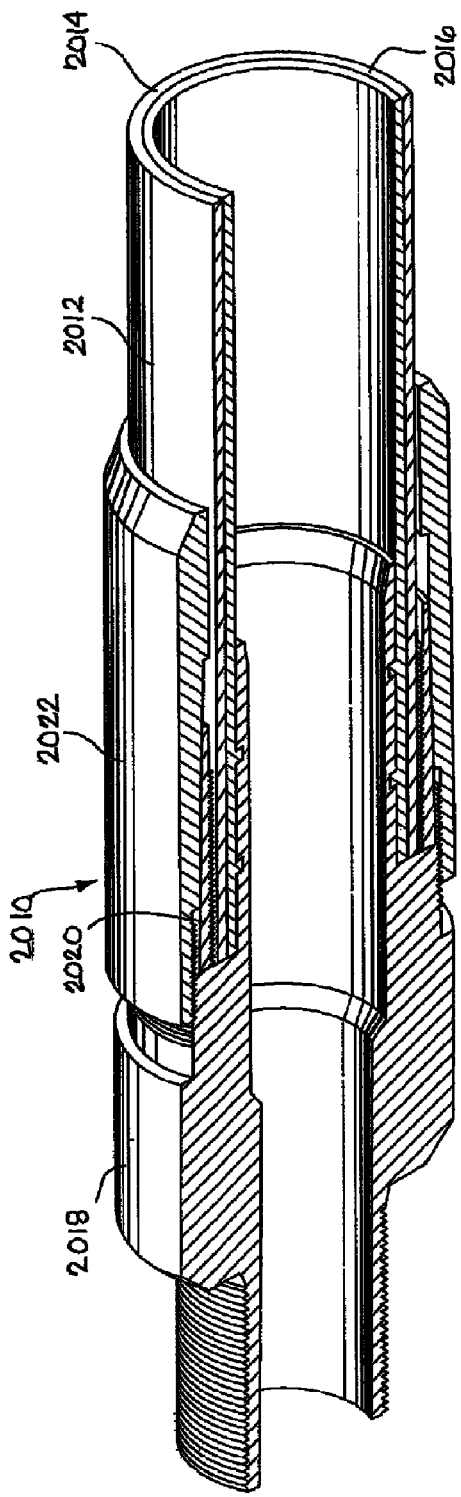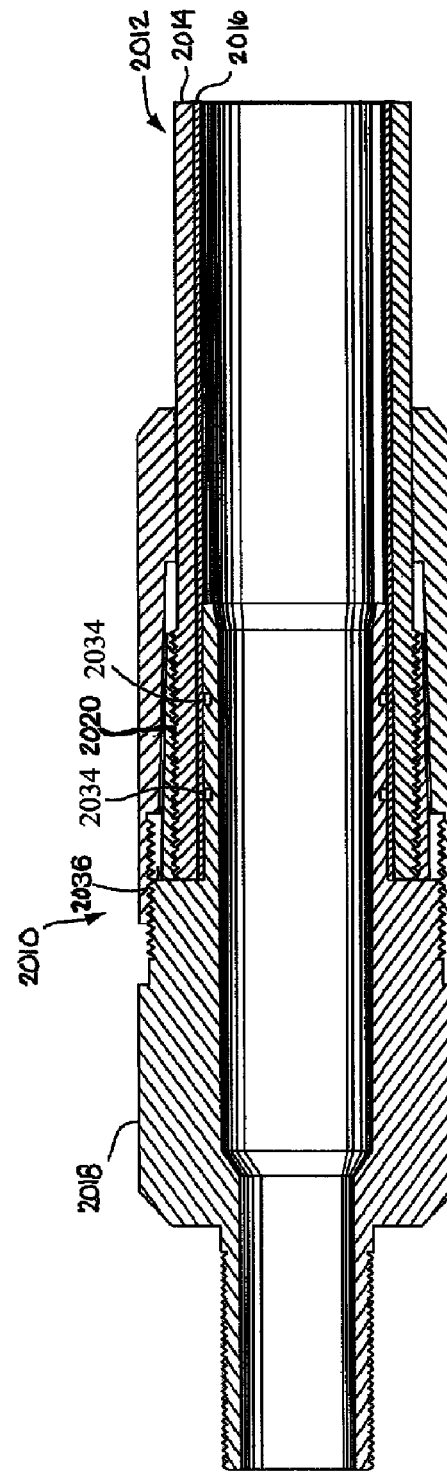

COMPOSITE COILED TUBING END CONNECTOR

REFERENCE TO RELATED APPLICATIONS

This application is a continuation application of U.S. patent application Ser. No. 10/442,680, filed May 21, 2003, now U.S. Pat. No. 7,498,509, which is a continuation-in-part of U.S. patent application Ser. No. 09/410,605, filed Oct. 1, 1999, which is a continuation-in-part of U.S. patent application Ser. No. 09/368,333, filed Aug. 3, 1999, which is a continuation of U.S. patent application Ser. No. 08/721,135, filed Sep. 26, 1996, now U.S. Pat. No. 5,988,702, which claims priority to U.S. Provisional Application Ser. No. 60/005,377, filed Sep. 28, 1995.

U.S. patent application Ser. No. 10/442,680, identified above, is also a continuation-in-part of U.S. patent application Ser. No. 09/678,577, filed Oct. 3, 2000, which claims priority to U.S. Provisional Application Ser. No. 60/157,614, filed Oct. 4, 1999.

All of the above-referenced patent applications are expressly incorporated by reference herein in their entireties.

FIELD OF THE INVENTION

This application relates generally to connectors for use with a spoolable pipe constructed of composite material and more particularly to a field serviceable connector for use in such applications.

BACKGROUND OF THE INVENTION

A spoolable pipe in common use is steel coiled tubing which finds a number of uses in oil well operations. For example, it is used in running wireline cable down hole with well tools, such as logging tools and perforating tools. Such tubing is also used in the workover of wells, to deliver various chemicals downhole and perform other functions. Coiled tubing offers a much faster and less expensive way to run pipe into a wellbore in that it eliminates the time consuming task of joining typical 30 foot pipe sections by threaded connections to make up a pipe string that typically will be up to 10,000 feet or longer.

Steel coiled tubing is capable of being spooled because the steel used in the product exhibits high ductility (i.e. the ability to plastically deform without failure). The spooling operation is commonly conducted while the tube is under high internal pressure which introduces combined load effects. Unfortunately, repeated spooling and use causes fatigue damage and the steel coiled tubing can suddenly fracture and fail. The hazards of the operation and the risk to personnel and the high economic cost of failure in down time to conduct fishing operations forces the product to be retired before any expected failure after a relatively few number of trips into a well. The cross section of steel tubing expands during repeated use resulting in reduced wall thickness and higher bending strains with associated reduction in the pressure carrying capability. Steel coiled tubing presently in service is generally limited to internal pressures of about 5000 psi. Higher internal pressure significantly reduces the integrity of coiled tubing so that it will not sustain continuous flexing and thus severely limits its service life.

It is therefore desirable to provide a substantially non-ferrous spoolable pipe capable of being deployed and spooled under borehole conditions and which does not suffer from the structural limitations of steel tubing and which is also highly resistant to chemicals. Such non-ferrous spoolable pipe often carries fluids which may be transported from the surface to a downhole location as in the use of coiled tubing to provide means for treating formations or for operating a mud motor to drill through the formations. In addition, it may be desirable to pump devices through the spoolable pipe such as through a coiled tubing bore to a downhole location for various operations. Therefore, an open bore within the spoolable pipe is essential for some operations.

In the case of coiled tubing, external pressures can also be a major load condition and can be in excess of 2500 psi. Internal pressure may range from 5,000 psi to 10,000 psi in order to perform certain well operations; for example, chemical treatment or fracturing.

Tension and compression forces on coiled tubing are severe in that the tubing may be forced into or pulled from a borehole against frictional forces in excess of 20,000 lbf.

For the most part prior art non-metallic tubular structures that are designed for being spooled and also for transporting fluids, are made as a hose whether or not they are called a hose. An example of such a hose is the Feucht structure in U.S. Pat. No. 3,856,052 which has longitudinal reinforcement in the side walls to permit a flexible hose to collapse preferentially in one plane. However, the structure is a classic hose with vulcanized polyester cord plies which are not capable of carrying compression loads or high external pressure loads. Hoses typically use an elastomer such as rubber to hold fiber together but do not use a high modulus plastic binder such as epoxy. Hoses are designed to bend and carry internal pressure but are not normally subjected to external pressure or high axial compression or tension loads. For an elastomeric type material such as used in hoses the elongation at break is so high (typically greater than 400 percent) and the stress-strain response so highly nonlinear; it is common practice to define a modulus corresponding to a specified elongation. The modulus for an elastomeric material corresponding to 200 percent elongation typically ranges from 300 psi to 2000 psi. The modulus of elasticity for typical plastic matrix material used in a composite tube is from 100,000 psi to 500,000 psi or greater, with representative strains to failure of from 2 percent to 10 percent. This large difference in modulus and strain to failure between rubber and plastics and thus between hoses and composite tubes is what permits a hose to be easily collapsed to an essentially flat condition under relatively low external pressure and eliminates the capability to carry high axial tension or compression loads while the higher modulus characteristic of the plastic matrix material used in a composite tube is sufficiently stiff to transfer loads into the fibers and thus resist high external pressure and axial tension and compression without collapse. The procedure to construct a composite tube to resist high external pressure and compressive loads involves using complex composite mechanics engineering principles to ensure that the tube has sufficient strength. It has not been previously considered feasible to build a truly composite tube capable of being bent to a relatively small diameter, and be capable of carrying internal pressure and high tension and compression loads in combination with high external pressure requirements. Specifically a hose will not sustain high compression and external pressure loads.

In operations involving spoolable pipe, it is often necessary to make various connections such as to interconnect long sections or to connect tools or other devices into or at the end of the pipe string. With steel coiled tubing, a variety of well known connecting techniques are available to handle the severe loads encountered in such operations. Threaded connections as well as welded connections are easily applied and meet the load requirements described.

Grapple and slip type connectors have also been developed for steel coiled tubing to provide a low profile and also be field serviceable. These steel tubing connectors are not applicable to the composite coiled tubing that is now being developed. One such connector is shown in U.S. Pat. No. 4,936,618 to Sampa et al showing a pair of wedge rings for making a gripping contact with the coiled tubing.

The PETRO-TECH Tools Incorporated catalog shows coiled tubing E-Z Connectors, Product Nos. 9209 to 9211 that are also examples of a slip type steel coiled tubing connector.

Another connector for reeled thin-walled tubing is shown in U.S. Pat. No. 5,156,206 to Cox and utilizes locking slips for engaging the tubing in an arrangement similar to the Petro-Tech connector.

U.S. Pat. No. 5,184,682 to Delacour et al shows a connector having a compression ring for engaging a rod for use in well operations, again using a technique similar to a Petro-Tech connector to seal against the rod.

These commercial coiled tubing connectors will not seal properly as configured to a composite pipe partially because of circumferential deformation of the pipe inwardly when the connector is made up on composite pipe and also because the external surface of a composite tube or pipe is not as regular in OD tolerance which causes sealing problems.

U.S. Pat. No. 4,530,379 to Policelli teaches a composite fiber tubing with a structural transition from the fiber to a metallic connector. The fibers may be graphite, carbon, aramid or glass. The FIG. 4 embodiment can be employed in a fluid conveyance pipe having bending loads in addition to internal pressure loads and in structural members having bending and axial stiffness requirements.

There are many connectors designed for application to elastomeric hoses and tubes such as shown in U.S. Pat. No. 3,685,860 to Schmidt, U.S. Pat. No. 3,907,335 to Burge et al, but sealing to these hoses is substantially different in that the hose body itself serves as a sealing material when pressed against connecting members. A composite pipe is too rigid to function in this way. U.S. Pat. No. 4,032,177 to Anderson shows an end fitting for a non-metallic tube such as a plastic tube and having a compression sleeve and a tubing reinforcing insert but here again the tube itself is deformable to the extent of effecting a seal when compressed by the coupling.

Another coupling for non-metallic natural gas pipe is shown in U.S. Pat. No. 4,712,813 to Passerell et al and shows a gripping collet for engaging the outer tubular surface of the pipe and a sealing arrangement for holding internal gas pressure within the pipe but no inner seals are on the pipe and seals cannot be changed without disturbing the gripping mechanism.

U.S. Pat. No. 5,351,752 to Wood et al shows a bonded connector for coupling composite tubing sections for pumping a well. The composite tubing has threaded fittings made of composite materials which are bonded to the tubing.

SUMMARY OF THE INVENTION

In accordance with embodiments of the invention, a connector is provided for use with composite spoolable pipe such as for use in line pipe, production tubing, well logging and workover operations in oil wells. The pipe which is spoolable is comprised of an outer composite structure containing several plies of high strength and stiffness fibers embedded in a resin material such as epoxy. The fibers are oriented to resist internal and external pressure and provide low bending stiffness. Fibers of high strength and modulus are embedded and bonded into a matrix that keeps the fibers in position, acts as a load transfer medium and protects the fibers from environmental damage. The plastic binder in which the fibers are embedded to form the matrix will have a modulus of elasticity (hereinafter modulus) that exceeds 100,000 psi. Typically, a liner may be employed in the pipe to serve as a structural member, one function of which is pressure containment to resist leakage of internal fluids within the tubing. A wear surface may be employed as an outer layer and may be comprised of a binder containing particles of a tough material.

In one embodiment, a connector for attaching a composite pipe to a service member can include a service end, a slip nut, a slip, a seal carrier, and an energy conductor. The service end can have a first coupling surface for connecting the pipe with the service member and a second coupling surface for assembling the service end with the pipe. The slip nut can be disposed about the outer surface of the pipe and can be engaged with the second coupling surface on the service end. The slip can be positioned about the outer surface of the pipe and can be engaged by the service end and the slip nut to compress the slip into gripping contact with the pipe upon progressive engagement of the service end with the slip nut. The slip can have teeth formed on the inner surface thereof for engaging the outer surface of the pipe. The seal carrier can be positioned in a bore of the pipe when the connector is coupled to the pipe. The seal carrier can be positioned in the bore of the pipe at a location radially opposite the slip to resist deformation of the pipe when the slip is compressed into gripping contact with the pipe. The energy conductor can be embedded within and surrounded by a material of the service end for connection with an energy conductor within the composite pipe.

In one aspect, the seal carrier can be removeably and replaceably positionable within a bore of the service end.

In one aspect, the seal carrier and the service end can be of unitary construction.

In accordance with one embodiment of the present invention, a connector provides a means for its being secured to an end of such a composite tube or pipe in any one of numerous termination applications including, end connectors, joint splices, service or tool connectors, to name a few. The connector is arranged to be field serviceable and also to maintain the full design ratings of the pipe string and components being connected (such as in tension, compression and pressure). The composite pipe body is generally rigid and therefore the structural integrity and geometry of the pipe must be preserved as the connector is assembled, run and placed in service on the composite spoolable pipe. The connector utilizes a service end which is arranged about the end of a composite tube, a slip nut, also encompassing the pipe, is arranged to be threaded into the inner end of the service end and when threadedly pulled toward one another, these sections act against a load slip system to compress teeth on the slip into the outer surface of the composite pipe. These teeth must be sized and shaped to provide a unitary structure with the composite materials when the teeth are compressed into the composite pipe. In this respect, the load slip is provided with pointed teeth that are capable of penetrating the wear surface and at least one outer ply of the composite tube and thereby access a load transfer capability that encompasses the resin matrix and at least one layer of fiber. A slip load support mandrel may be positioned in the inner bore of the composite pipe establishes hoop strength within the composite pipe and thereby provides a backup to the load slip to insure that its teeth are properly embedded into the plies of composite materials. The slip teeth are arranged so that they penetrate beyond the outermost surface and into the composite body to an extent that permits transfer of load into the composite body.

In accordance with one embodiment of the present invention, the end connector includes a service end, a slip nut disposed about the outer surface of the composite pipe and engageable with the service end, and a slip positioned about the outer surface of the pipe and engaged by the service end and the slip nut. Progressive engagement of the service end relative to the slip nut radially compresses the slip into gripping contact with the pipe. The slip preferably includes pipe-engaging teeth that are sized and shape to penetrate into an outer layer of the composite pipe. A seal carrier is received within the service end and within the pipe and carries one or more seal members, such as an elastomeric O-ring, to seal between the pipe and the seal carrier. The seal carrier is positioned in the pipe bore at a location radially opposite the slip to resist deformation of the pipe when the slip is compressed into gripping contact with the pipe.

In contrast to the connector embodiments described above, the end connector of the first alternative embodiment does not require a separate load support member. Instead, by positioning the seal carrier radially opposite the slip, the seal carrier establishes a seal between the pipe bore while concomitantly resisting deformation of the pipe from the radially compressive forces applied by the slip. Preferably, the seal carrier is of single piece, unitary construction. In addition, the seal member or seal members carried by the seal carrier can also be positioned radially opposite the slip. In this arrangement, the radially compressive force from the slip can operate to enhance the sealing relationship between the seal members and the interior of the pipe.

In accordance with further aspect of the present invention, a connector for connecting a first composite pipe with a second composite pipe can be provided. The pipe-to-pipe connector of the present invention includes a service end for receiving an end of the first pipe and a slip nut for receiving an end of the second pipe. The service end is engageable with the slip nut. First and second slips are positioned about the first and second pipes, respectively. Progressive engagement of the service end with the slip nut compresses the first slip into contact with the first composite pipe while at the same time compressing second slip nut into contact with the second pipe. A double seal carrier is positioned within the end of the first pipe and within the end of the second pipe. A first seal member is provided on the double seal carrier to sealingly engage the inner surface of the first pipe. A second seal member is provided on the double seal carrier to sealingly engage the inner surface of the second pipe in a sealing relationship.

The double seal carrier of the pipe-to-pipe connector of the present invention is preferably of single piece, unitary construction. The one piece double seal carrier establishes a seal between the connector and the composite pipes and, in addition, resists deformation of the pipes due to the radially compressive forces applied by the first and second slips. Preferably, the double seal carrier is positioned within the first and second composite pipes such that the first seal member is located radially opposite the first slip and the second seal member is located radially opposite the second slip. As discussed above, this arrangement can enhance the fluid seal provided by the seal members. The double seal carrier can include a raised annular shoulder that axially engages both the end of the first pipe and the end of the second pipe.

In accordance with one embodiment of the present invention, the seal carrier of the end connector can be replaced with a generally annular, integral seal positioned at the end of the composite pipe. The integral seal can be formed from a portion of a layer of the pipe to provide the primary fluid seal between the composite pipe and the end connector. By folding a layer of the composite member radially outward at the end of the composite pipe, the integral seal can be formed having a seal surface for engaging the service end of the end connector in sealing relationship. Preferably, the layer is folded into contact with the remaining layers of the composite pipe to inhibit delamination of the layers from fluid leakage through the end of the pipe. Any layer or layers of the composite pipe can be used to form the integral seal. It is preferable, however, for the innermost layer of the composite pipe to be used to create the integral seal. In this manner, a substantial portion of the radially extending surface of the pipe end is enclosed by the integral seal. Alternatively, the outermost layer of the composite pipe can be utilized to create the integral seal. In this case, the outermost layer can be folded radially inward to form the integral seal.

In accordance with a method of coupling a connector to a composite pipe of the present invention, the integral seal can be formed by removing the outer layers of the composite pipe at the end of the pipe to expose a portion of an inner layer of the composite pipe. The exposed portion of the inner layer can be heated until the material forming the layer becomes pliable. The exposed portion can then be folded such that the outer surface of the layer engages the ends of the outer layers of the pipe. The inner surface of the folded layer provides the seal surface of the integral seal. Additionally, the ends of the outer layers of the composite pipe can be heated so that the folded layer can coalesce or bond with the ends of the outer layers. The connector is attached to composite pipe and engages the seal surface of the integral seal in a sealing relationship.

In accordance with one embodiment of the present invention, the double seal carrier of the pipe-to-pipe connector of the present invention can be replaced by integral seals formed at the end of the first composite pipe and the end of the second composite pipe. The integral seals can be created as discussed above, by radially folding a layer of the composite pipe at the end of the pipe to create a seal surface for engaging a service end. The integral seal of the first composite pipe can be bonded or welded to the integral seal of the second composite pipe to provide an enhanced fluid seal between the ends of the pipes. Alternatively, a gasket can be interposed between the integral seals to improve the fluid seal between the ends of the pipes.

A connector for attaching a composite pipe to a service member according to the teachings of the present invention includes a service end, a slip nut disposed about the outer surface of the composite pipe and engageable with the service end, and a slip positioned about the outer surface of the pipe and engaged by the service end and the slip nut. Progressive engagement of the service end relative to the slip nut radially compresses the slip into gripping contact with the pipe. The service end includes an integral seal carrier having a seal thereon to seal between the pipe bore and the service end. The integral seal carrier is positioned within the bore of the pipe when the end connector is coupled to the composite pipe. Preferably, the integral seal carrier is positioned in the pipe bore at a location radially opposite the slip to resist deformation of the pipe when the slip is compressed into gripping contact with the pipe.

In contrast to the conventional connectors, the connector of the of the present invention does not require a separate seal carrier or a separate load support member. Instead, the service end provides an integral seal carrier to establish a seal between the pipe bore while concomitantly resisting deformation of the pipe from the radially compressive forces applied by the slip. Preferably, the service end including the integral seal carrier is of single piece, unitary construction. In addition, the seal member or seal members carried by the integral seal carrier can also be positioned radially opposite the slip. In this arrangement, the radially compressive force from the slip can operate to enhance the sealing relationship between the seal members and the interior of the pipe.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principles of the invention and, although not to scale, show relative dimensions.

FIG. 11 is a perspective view in cross-section of a pipe-to-pipe connector in accordance with the teachings of the present invention, illustrating the connector coupling two composite pipes;

FIG. 12 is a side elevational view in cross section of the pipe-to-pipe connector of FIG. 12;

FIG. 14 is a perspective view of an alternative embodiment of the end connector of the present invention, illustrating the end connector coupled to a composite pipe;

FIG. 15 is a side elevational view in cross-section of the end connector of FIG. 15;

FIG. 16 is a partially exploded, perspective view of an alternative embodiment of the pipe-to-pipe connector of the present invention;

FIG. 17 is a partially exploded, side elevational view in cross-section of the pipe-to-pipe connector of FIG. 16;

FIG. 18 is a partially exploded, perspective view of a further alternative embodiment of the pipe-to-pipe connector of the present invention;

FIG. 19 is a partially exploded, side elevational view in cross-section of the pipe-to-pipe connector of FIG. 18;

FIG. 23 is a perspective view in cross-section of the end connector of the present invention, illustrating the end connector coupled to the end of a composite pipe;

FIG. 24 is a side elevational view in cross-section of the end connector of FIG. 23;

DETAILED DESCRIPTION OF THE INVENTION

While this invention is directed generally to providing connectors for composite spoolable pipe, the disclosure is directed to a specific application involving line pipe, coiled tubing service and downhole uses of coiled tubing. Composite coiled tubing offers the potential to exceed the performance limitations of isotropic metals, thereby increasing the service life of the pipe and extending operational parameters. Composite coiled tubing is constructed as a continuous tube fabricated generally from non-metallic materials to provide high body strength and wear resistance. This tubing can be tailored to exhibit unique characteristics which optimally address burst and collapse pressures, pull and compression loads, as well as high strains imposed by bending. This enabling capability expands the performance parameters beyond the physical limitations of steel or alternative isotropic material tubulars. In addition, the fibers and resins used in composite coiled tubing construction make the tube impervious to corrosion and resistant to chemicals used in treatment of oil and gas wells.

High performance composite structures are generally constructed as a buildup of laminant layers with the fibers in each layer oriented in a particular direction or directions. These fibers are normally locked into a preferred orientation by a surrounding matrix material. The matrix material, normally much weaker than the fibers, serves the critical role of transferring load into the fibers. Fibers having a high potential for application in constructing composite pipe include glass, carbon, and aramid. Epoxy or thermoplastic resins are good candidates for the matrix material.

The connector of the present invention can have application to any number of composite tube designs but is arranged to be applied to a pipe having an outer surface made from a composite material that can receive gripping elements which can penetrate into the composite material without destroying the structural integrity of the outer surface. This outer surface can act as a wear surface as the pipe engages the surface equipment utilized in handling such pipe. The composite pipe is suitable for use in wellbores or as line pipe.

Figure 1:
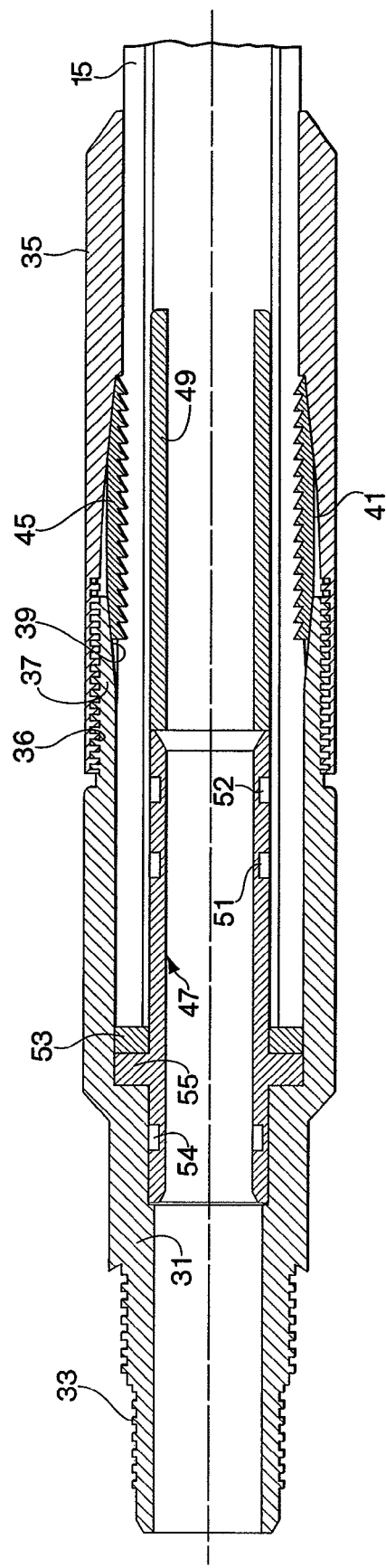
FIG. 1 is a cross-sectional, elevational view of an end connector assembly for use with a composite tube and embodying principals of the present invention.

Referring to FIG. 1, an end connector assembly is shown having a service end 31 having a threaded end portion 33 for connection to other devices or components in a bottom hole assembly, or to connect to other lengths of spoolable pipe. A slip nut 35 has an internally threaded end portion 36 for engagement with external threads on a trailing end 37 of the service end 31. A bevel 39 is formed in the bore of the trailing end 37 to form a reverse load flank. A beveled surface 41 is also formed in the bore of the slip nut 35. The beveled surfaces 39, 41 together form a cavity when the slip nut 35 and service end 31 are threadedly engaged as shown in FIG. 1. This cavity is shaped to receive and matingly engage the oppositely beveled outer surfaces formed on a splined tooth load slip 45. Other components of the connector assembly comprise a seal carrier 47 and a slip load support 49 that is arranged, in assembly, within the bore of the composite pipe 15.

When assembled, the bore of slip nut 35 is slid up over the outer surface of the pipe 15 well back from the service end of the pipe. The slip load support 49 is then positioned in the bore of pipe 15 at a spaced distance from the end of the pipe which is calculated to be opposite the cavity in the connector assembly receiving the slip 45. Next the slip 45 is positioned about the outer surface of the composite pipe opposite the position of the load support 49. The seal carrier 47 together with seals 51, 52 on the outer surface of the carrier and seat ring 53 positioned against shoulder 55, are assembled into and against the end of the composite coiled tubing. The seat ring may be constructed of a material such as Nitrile, Viton or Teflon. The seal ring 53 can be constructed of a material having a hardness of 80° to 100° durometer. The seals 51 and 52 seal off the space between the outer surface of the carrier 47 and the bore of the tubing 15. Sealing between the bore of composite pipe 15 and the connector provides the advantage of sealing to a more accurately dimensioned and regular surface, to thereby enhance sealing performance. The seat ring 53 seals off and protects the end of the tubing 15. In addition all these seals are removable and replaceable by removing the carrier from the end of the tubing 15. This can be done without disturbing the load transfer mechanism of the connector, i.e. the slip system.

The service end 31 is then inserted over the end of the tubing 15 and an outer end portion 56 of carrier 47 projecting out of the end of tubing 15. A rubber seal 54 is positioned on this projecting end portion 56 to seal between the carrier 47 and the bore of service end 31. When the carrier 47 is inserted into the bore of tubing 15, its length is sized to engage the slip load support 49 and move it into the proper position within the tubing to be opposite the slip 45. The last step in the assembly is to move the slip nut 35 forward on the tubing until it can be threadedly made up onto the threaded trailing end 37 of the service end 31. As this threaded connection is made up, the tapered surface 39 on the trailing end 37 and a similar beveled undercut 41 on the bore of slip nut 35 engage respective surfaces 57, 58 of a double tapered outer surface of the slip 45. This engaging action of surfaces 57, 58 on the slip 45 with the beveled surfaces 39 and 41 serves to compress the slip teeth into the outer surface of the tubing 15.

Figure 2:
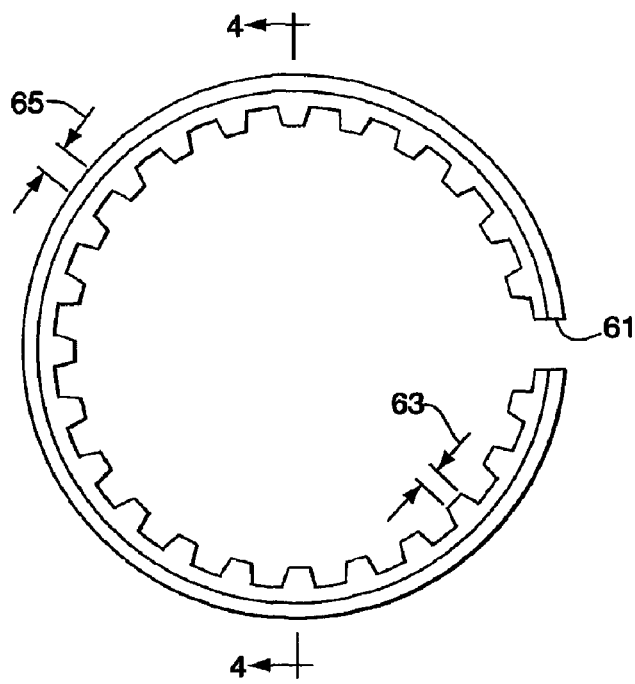
FIG. 2 shows a cross-sectional perspective, view of an embodiment of a toothed slip used in the connector of FIG. 1 for engaging the connector body to the composite tube.
Figure 3:
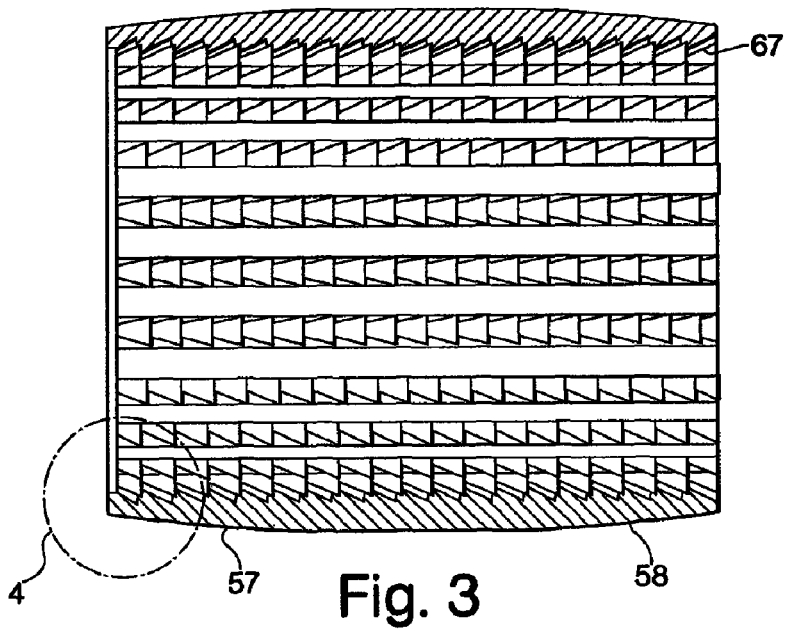
FIG. 3 shows a partial end view of another embodiment of the toothed slip, showing the configuration of teeth for engaging the composite material in a tubular member receiving the connector.
Figure 4:
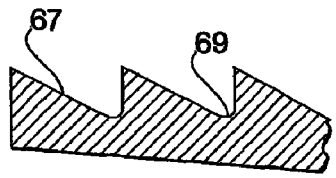
FIG. 4 is a detailed, elevational view of the slip teeth shown in FIG. 3.

FIGS. 2-4 show the slip 45 in detail having the longitudinally oppositely tapered surfaces 57, 58 on its outer surface. A longitudinal slot 61, shown in FIG. 2, provides a means for collapsing or compressing the slip 45 about the pipe 15 and thereby embed the slip teeth into the outer layer(s) of the composite pipe. The teeth have a laterally flat top edge 63 and a laterally flat spacing 65 between longitudinal rows of teeth. A sloping surface 67 of the teeth tapers from an outward edge 63 to a flat valley 69 between lateral or circumferential rows of teeth. The teeth can be arranged in substantially longitudinal rows that are circumferentially spaced 10° to 20° from one another, and the rows of teeth can be separated by a flat bottomed furrow each having a width of at least 0.09 inches. The distance between parallel circumferential rows can be from 0.08 to 0.12 inches. These teeth, as contrasted to spiral threads used on steel tube applications are arranged to fully embed into the outer surface so that the valley surface 69 on the toothed slip is in contact with the material in the outer layers and the entire tooth surface area is engaged with material in the composite pipe layers. It is preferable that the teeth penetrate into the laminate of fibers and encompassing resin in the composite tube to provide the shear strength needed to ensure adequate tensile load strength. The top flat edge 63 is likewise arranged to provide a firm and extensive lateral surface on the teeth to give tensile strength to the load transfer system.

The longitudinal flat spiral furrow 65, between rows of teeth, serves to provide a frictional engaging surface between the slip and the pipe's outer surface to further enhance the load transfer factor between the connector and the pipe. The width of this furrow surface 65 may be in the range of 0.110 to 0.120 inches for a slip used with 1½ inches OD composite pipe. This represents a total furrow 65 cross-sectional surface that is greater than 50% of the circumference measurement on the inner toothed surface of the slip.

The service to which a coiled tubing string is subjected provides a rather severe physical environment. Internal pressures may be in the order of 7,000 to 10,000 psi; while tensile loads can be as much as 20,000 to 25,000 psi. With this in mind it is readily seen that load transfer between a connector and the composite pipe is of critical importance and features such as those described in the present application, as for example in the shape and spacing of teeth on the slip, become extremely important to the overall success of this new product.

An alternative embodiment of the end connector of the present invention is illustrated in FIGS. 5-10C. The end connector 100 provides for the attachment of a composite pipe 102 to a service member (not shown), such as a logging tool, or t-fitting in a pipeline. The composite pipe 102 includes at least one composite layer 104 of fibers embedded in a polymer matrix and preferably includes a substantially fluid impervious interior liner 106 disposed concentrically within the composite layer 104. Although only one composite layer is illustrated and described herein, one skilled in the art will appreciate that the composite pipe 102 can include multiple composite layers depending on the application and service in which the composite pipe is to be used. The principal components of the end connector 100 include a service end 108, a slip 110, a slip nut 112, and a seal carrier 114.

Referring to FIGS. 5-7B, the service end 108 includes a first coupling surface 116 at one end thereof for connecting the pipe 102 with a service member and a second coupling surface 118 the other end thereof for connecting the service end 108 with the slip nut 112 and thereby assembling the service end 108 to the pipe 102. The first and second coupling surfaces 116 and 118 can be threaded as illustrated or can be provided with alternative mechanisms for attaching the service end to the service member or the pipe. The service end 108 includes a generally conically tapered, tubular housing bore 122 sized and shaped to receive an end of the seal carrier 114. The housing bore 122 tapers from an increased diameter at the second coupling surface 118 to a reduced diameter at the first coupling surface 116.

Figure 10A:
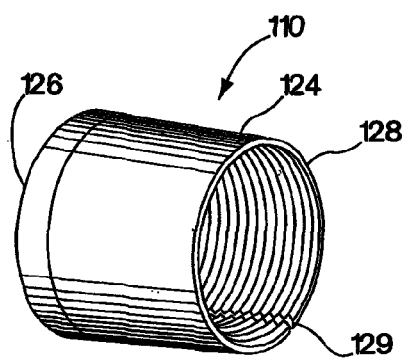
FIG. 10A is a perspective view of the slip of the end connector of FIG. 5.
Figure 10B:
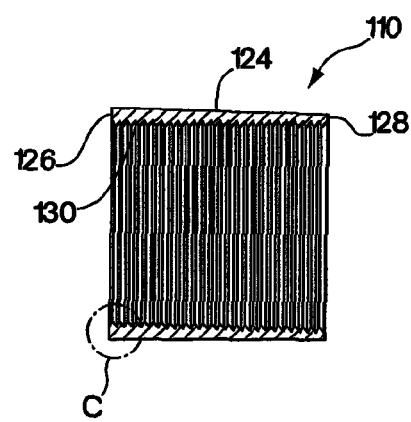
FIG. 10B is a side elevational view in cross section of the slip of FIG. 10A.
Figure 10C:
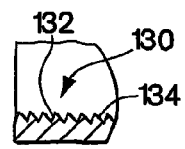
FIG. 10C is a detailed elevational view of the teeth of the slip of FIG. 10A.

Referring to FIGS. 5, 6, and 10A-10B, the slip 110 is generally cylindrical in shape and is sized to fit about the outer surface of the composite pipe 102. The slip 110 includes a tapered outer surface 124 that tapers from an increased diameter at a distal end 126 to a reduced diameter at a distal end 128. A longitudinal slot 129 is formed in the slip 110 to permit radially compression of the slip. The slip 110 can also be formed in multiple sections to permit radial compression. Pipe-engaging teeth 130 are formed on the inner surface of the slip 110. The teeth 130 are sized and shaped to fully embed into the outer surface of the composite pipe 102. The teeth 130 are arranged in longitudinally or helically spaced rows. Each row includes a generally radially extending surface 132 that intersects with an angled surface 134 to form a sharp point 136, as best illustrated in FIG. 10C. Preferably, the entire surface of each tooth, i.e. the radially extending surface 132 and the angled surface 134, is engaged with the fibers and the polymer resin forming the composite layer 104 of the pipe 102. In this manner, the teeth 130 permit the transfer of loads into the composite layer 104 of the composite pipe 102.

Alternatively, the slip 110 can be provided with teeth sized, shaped, and arranged in a manner analogous to the teeth of the slip 45 of the first embodiment of the present invention, as described above.

Figure 5:
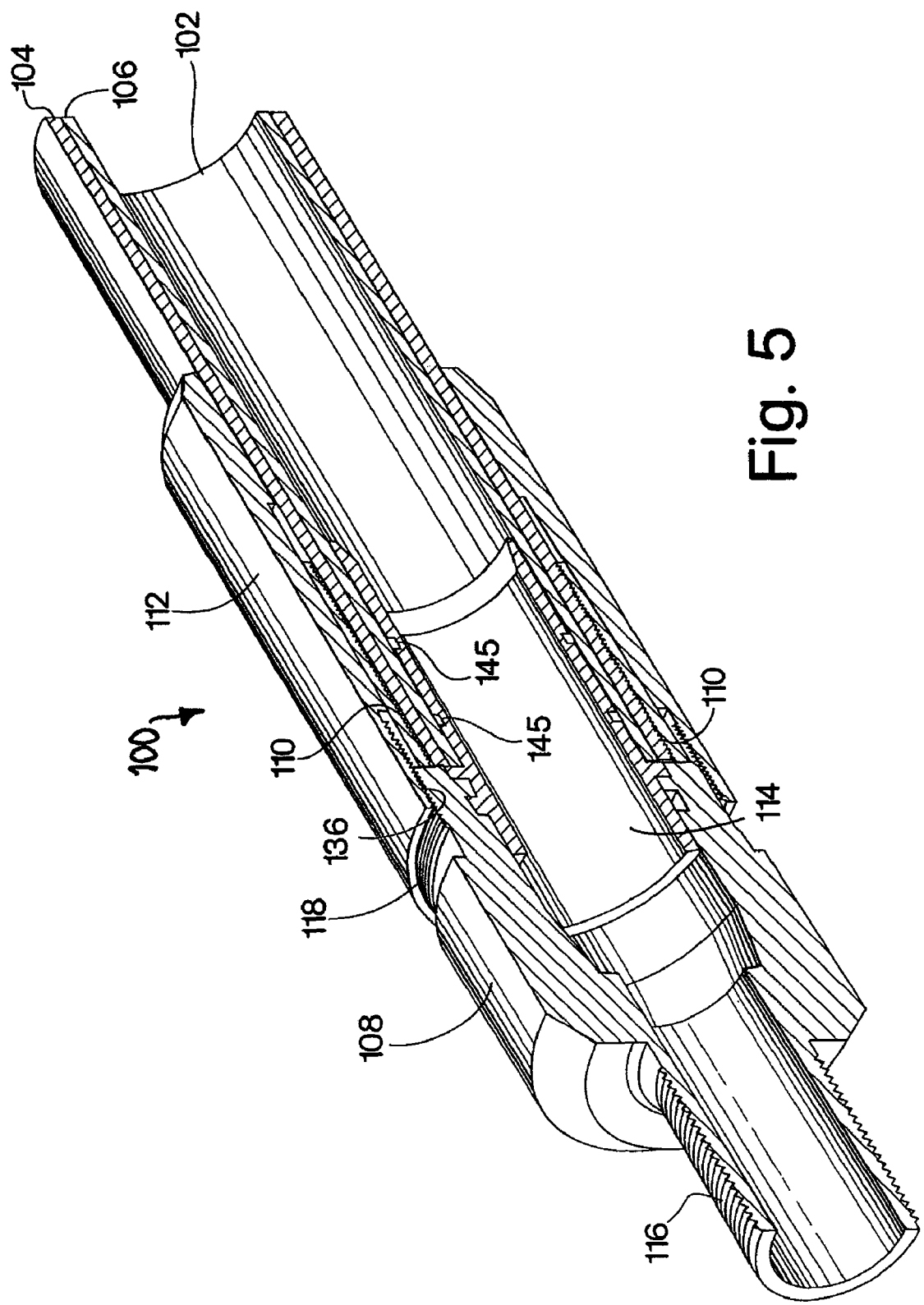
FIG. 5 is a perspective view in cross-section of an alternative embodiment of the end connector of the present invention, illustrating the end connector coupled to the end of a composite pipe.
Figure 6:
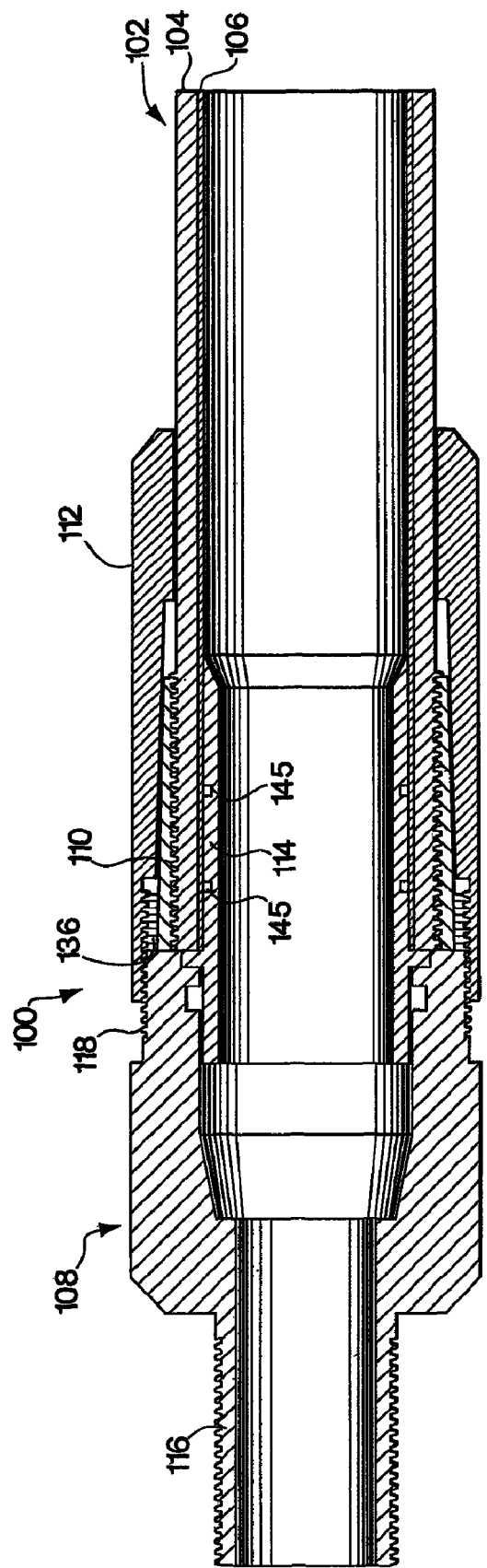
FIG. 6 is a side elevational view in cross-section of the end connector of FIG. 5.
Figure 8:
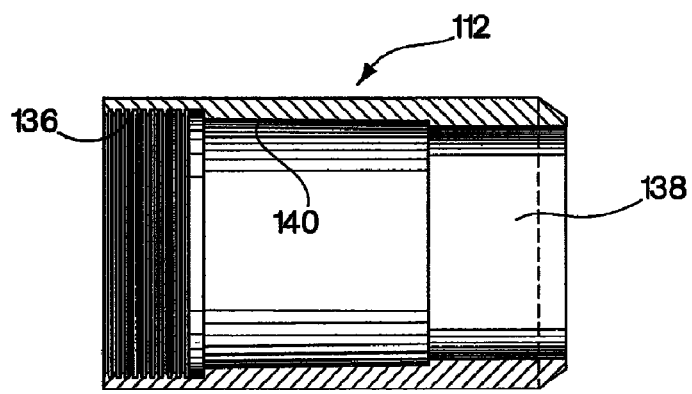
FIG. 8 is a side elevational view in cross-section of the slip nut of the end connector of FIG. 5.
Figure 9A:
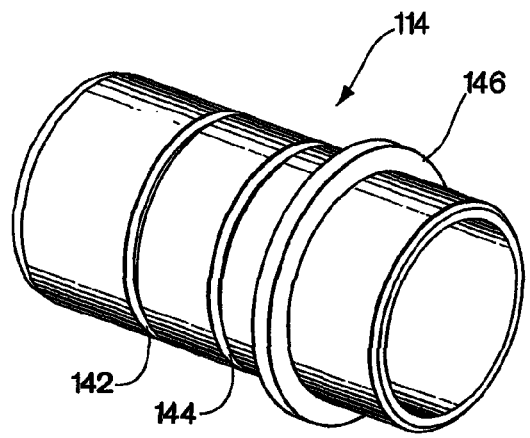
FIG. 9A is a perspective view of the seal carrier of the end connector of FIG. 5.
Figure 9B:
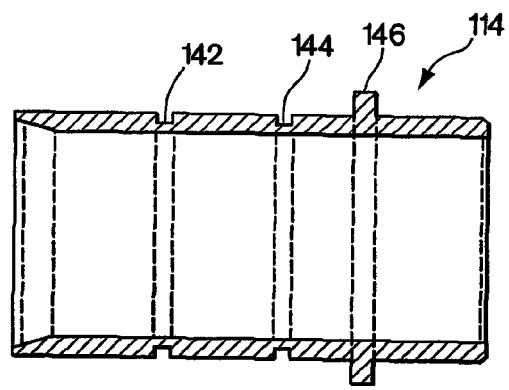
FIG. 9B is a side elevational view in cross-section of the seal carrier of FIG. 9A.

Continuing to refer to FIGS. 5 and 6, and referring specifically to FIG. 8, the slip nut 112 is generally cylindrical in shape and is provided with a threaded coupling surface 136 formed on the inner surface thereof. The inner bore 138 of the slip nut 112 includes a centrally located tapered surface 140 for engaging the outer surface 124 of the slip 110 when the end connector 100 is coupled to the pipe 102. The inner bore 138 is sized to permit the slip nut 112 to be positioned about the outer surface of the composite pipe 102.

The seal carrier 114 is generally cylindrical in shape and is preferably of single piece, unitary construction. The seal carrier 114 is sized to be received within the bore of the composite pipe 102 and the housing bore 112 of the service end 108, as shown in FIGS. 5, 6, and 9A-9B. Annular grooves 142 and 144 are formed in the outer surface of the seal carrier 114 to receive seal members 145, such as elastomeric O-rings, for providing a seal between the seal carrier 114 and the composite pipe 102. One skilled in the art will recognize that additional seal members or a single seal member may be used depending on the integrity of the fluid seal desired. An annular, raised shoulder 146 extends radially outward from the outer surface of the seal carrier 114. The annular shoulder 146 engages a radially inward extending surface 148 (FIG. 7B) of the service end 108 when the end connector 100 is coupled to the composite pipe 102.

Figure 21:
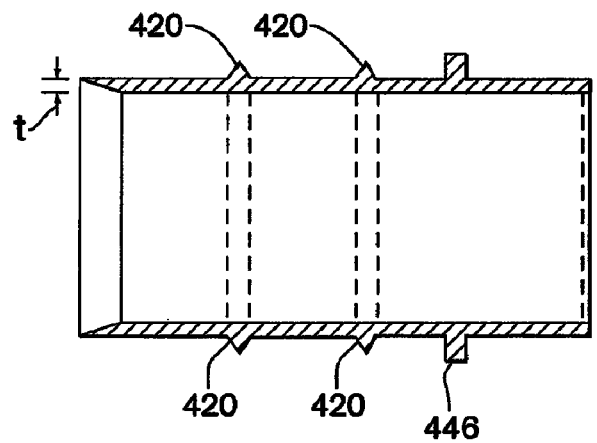
FIG. 21 is a side elevational view in cross-section of a seal carrier of a connector of the present invention, illustrating raised annular ridges formed on the seal carrier in accordance with the teachings of the present invention.

An alternative embodiment of the seal carrier 414 is illustrated in FIG. 21, in which the annular grooves and the seal members are replaced with raised, barb-like, ridges 420. The ridges 420 can be generally triangular in cross-section to form a sharpened point for embedding into the inner layer, such as the interior liner, of the composite pipe. The ridges 420 can also have other cross-sectional shapes sufficient for the ridges to embed in the inner layer of the composite pipe. The ridges 420 can also be spiral or circular oriented threads. The seal member 414 also includes an annular shoulder 446 for abutting the end of the composite pipe. The raised ridges 420 eliminate the need for separate seal members, which can wear during use resulting in fluid leakage. Also, because grooves need not be formed in the seal carrier, the thickness of the wall 422 of the seal carrier, indicated by arrow t in FIG. 21, can be reduced. This reduction in thickness allows the seal carrier inner diameter to more closely match the inner diameter of the composite pipe thereby minimizing flow disruptions and turbulence of the fluid within the pipe at the interface of the seal carrier and the composite pipe.

Each of the components of the end connector 100, namely the service end 108, the slip 110, the slip nut 112 and the seal carrier 114 (or seal carrier 414) can be constructed from either metallic materials, composite materials, thermoplastics, elastomers, or combinations thereof.

When assembled, the slip nut 112 is slid over the outer surface of the composite pipe 102. The slip 110 is positioned about the composite pipe 102 and within a recess formed between the outer surface of the pipe and tapered surface 140 of the slip nut 112. The seal carrier 114 is positioned within the bore of the composite pipe 102 such that the shoulder 146 abuts the end of the composite pipe 102. The service end 108 is inserted over the end of the seal carrier 114 such that radial surface 148 of the service end 108 engages the annular shoulder 146 of the seal carrier 114. The slip nut 112 is coupled to the service end 108 by threaded engagement of the second coupling surface 118 and the threaded coupling surface 136 of the slip nut. During coupling, the service end 108 and the slip nut 112 move axially towards one another and the tapered surface 140 of the connector engages the tapered outer surface 124 of the slip 110. Once the distal end 126 of the slip 110 abuts the end of the service end 108, as best illustrated in FIG. 6, the engaging action of the tapered surface 140 on the slip 110 acts to radially compress the teeth 130 of the slip 110 into engagement with the outer surface of the composite pipe 102.

Figure 7A:
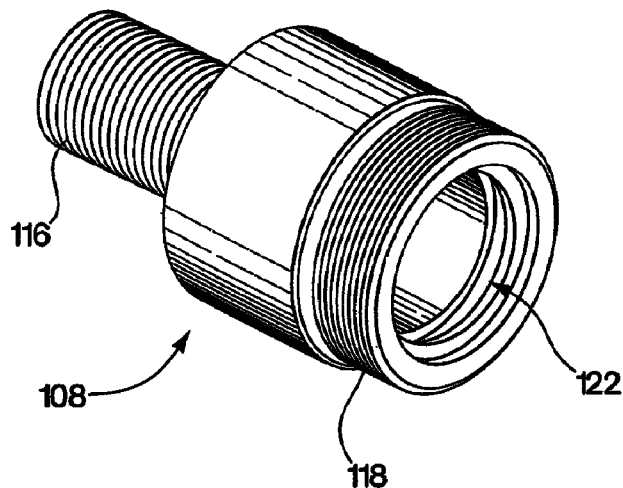
FIG. 7A is a perspective view of the service end of the end connector of FIG. 5.
Figure 7B:
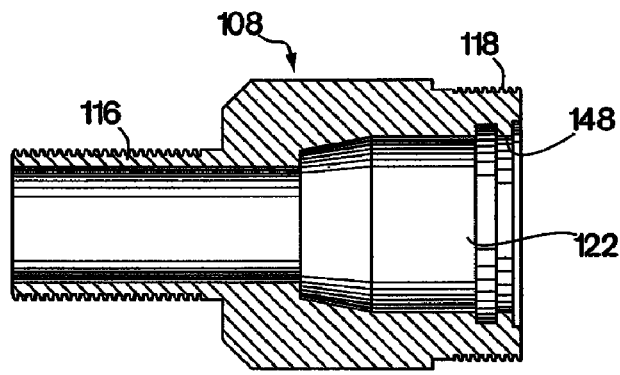
FIG. 7B is a side elevational view in cross-section of the service end of FIG. 7A.

Preferably, the seal carrier 114 is positioned such that the annular groves 142 and 142, and the seal members 145 are positioned radially opposite the slip 110 when the end connector 100 is coupled to the composite pipe 102, as illustrated in FIGS. 6 and 7. By positioning the seal carrier 114 in this manner, the seal carrier 114 can establish a fluid seal with the bore of the composite pipe 102 while concomitantly resisting deformation of the pipe from the radially compressive forces applied by the slip 110. Thus, in contrast to the connector embodiments described above, the end connector 100 does not require a separate load support member to inhibit deformation of the composite pipe 102. The seal carrier 114 provides this function. Additionally, in this arrangement, the radially compressive force from the slip 110 can operate to increase the sealing relationship between the seal members 145 and the bore of the composite pipe 102.

A connector 200 for establishing a pipe-to-pipe connection between a first composite pipe 202A and a second composite pipe 202B is shown in FIGS. 11 and 12. The pipe-to-pipe connector includes a service end 204 having a coupling surface 206 in the form of threads formed on the outer of the first service end 204 and the outer surface of the composite pipe. The first service end 204 includes a housing bore 208 for receiving an end of the first composite pipe 202A. A first slip 210A is positioned about the outer surface of the first composite pipe 202A and is received within a recess formed by a conically tapered surface 209 of the first service end 204. The first slip 210A can be sized and shaped in a manner analogous to the slip 110 of the end connector 100 or the slip 45, both of which are described above. In this regard, the first slip 110 preferably includes teeth sized, shaped, and arranged to penetrate and embed into the first composite pipe 202A.

A slip nut 212 includes a bore 214 for receiving an end of the second composite pipe 202B and has a second coupling surface 216 in the form of threads formed on the inner surface of the bore 214. The second coupling surface 216 is configured to matingly engage the first coupling surface 206 of service end 204. As discussed above, alternative attachment mechanisms can be employed in place of the first and second thread surfaces 206, 216. A second slip 210B is positioned about the outer surface of the second composite pipe 202B and is received within a recess formed by a conically tapered surface 216 of the slip nut 212 and the outer surface of the composite pipe. The second slip 210B, like the first slip 210A, can be sized and shaped in a manner analogous to the slip 110 of the end connector 100 or the slip 45, described above. In this regard, the second slip 210B includes teeth sized, shaped, and arranged to penetrate and embed into the second composite pipe 202B.

Figure 13A:
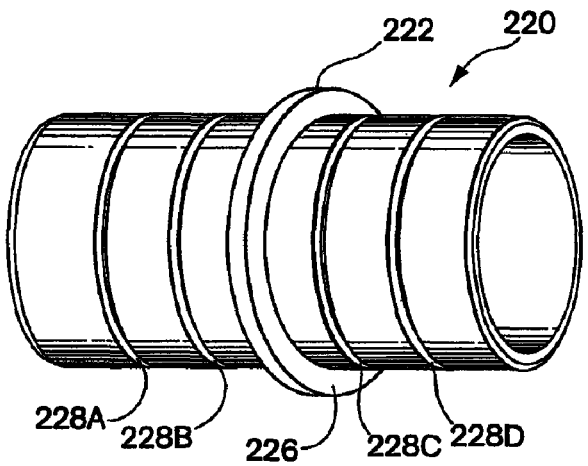
FIG. 13A is a perspective view of the double seal carrier of the pipe-to-pipe connector of FIG. 11.
Figure 13B:
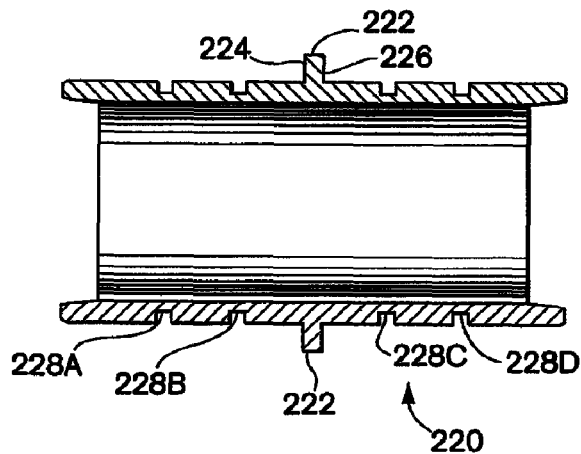
FIG. 13B is a side elevational view in cross-section of the double seal carrier of FIG. 13A.

Continuing to refer to FIGS. 11 and 12, and in particular to FIGS. 13A and 13B, a double seal carrier 220 is positioned within the end of the first composite pipe 202A and the end of the second composite pipe 202B. The double seal carrier 220 is preferably of single piece, unitary construction and is generally tubular in shape. The double seal carrier 220 includes a raised annular shoulder 222 having a first radially extending surface 224 for axially engaging the end of the first composite pipe 202A and a second radially extending surface 226 for axially engaging the end of the second composite pipe 202B. Annular grooves 228A, 228B, 228C, and 228D are formed in the outer surface of the seal carrier 220 and are sized and shaped to receive seal members 229, such as elastomeric O-rings. The seal members 229 sealingly engage the inner surface of the first composite pipe and the inner surface of the second composite pipe to provide a fluid seal between the double seal carrier 220 and both the first composite pipe 202A and the second composite pipe 202B.

Figure 13C:
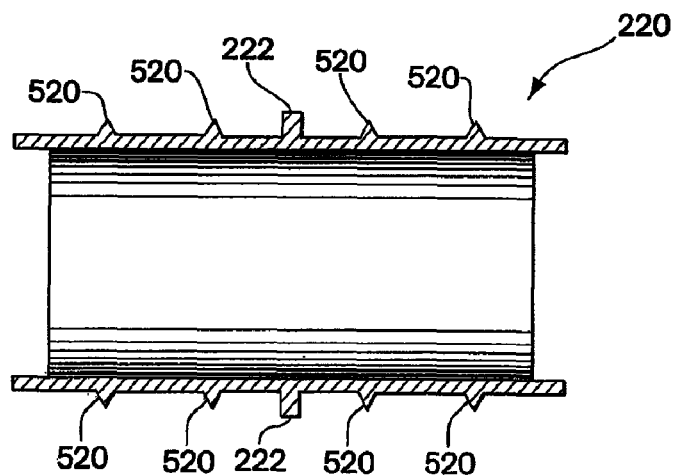
FIG. 13C is a side elevational view in cross-section of an alternative embodiment of the double seal carrier of FIG. 13A, illustrating raised ridges formed on the double seal carrier.

Alternatively, the annular grooves and the seal members of the double seal carrier 220 can be replaced with raised, barb-like replaced with raised, barb-like, ridges 520, as illustrated in FIG. 13C. The ridges 520 can be generally triangular in cross-section to form a sharpened point for embedding into the inner layer, such as the interior liner, of the composite pipe. The ridges 520 can also have other cross-sectional shapes sufficient for the ridges to embed in the inner layer of the composite pipe. The ridges 520 can also be spiral or circular oriented threads. The raised ridges 520 eliminate the need for separate seal members, which can wear during use resulting in fluid leakage. Also, because grooves need not be formed in the seal carrier, the thickness of the wall of the double seal carrier can be reduced. This reduction in thickness allows the seal carrier inner diameter to more closely match the inner diameter of the composite pipes thereby minimizing flow disruptions and turbulence of the fluid within the pipes at the interface of the double seal carrier and the composite pipes.

In assembly, the service end 204 is positioned about the end of the first composite pipe 202A and the slip nut 212 is positioned about the end of the second composite pipe 202B. The first slip 210A is positioned about the first composite pipe 202A and within the recess of the service end 204. Likewise, the second slip 210B is positioned about the second composite pipe 202B and within the recess of the slip nut 212. The double seal carrier 220 is then positioned within the end of the first composite pipe 202A and within the end of the second composite pipe 202B such that the first radially extending surface 224 of the shoulder 222 axially abuts the end of the first composite pipe 202A and a second radially extending surface 226 of the shoulder 222 axial abuts the end of the second composite pipe 202B. The service end 204 is then coupled to the slip nut 212. As the service end 204 and the slip nut 212 are drawn together axially, the conically tapered surface 209 and the conically tapered surface 216 engage the first and second slips 210A, 210B, respectively, to radially compress the teeth of the slips into engagement with the outer surface of the composite pipes.

Preferably, the double seal carrier 220 is positioned such that annular grooves 228A and 228B, and the seal members 229 carried therein, are positioned radially opposite the first slip 210A. Likewise, it is preferable for the annular grooves 228C and 228D, and the seal members 229 carried therein, to be positioned radially opposite the second slip 210B. By positioning the double seal carrier 220 in this manner, the double seal carrier can establish a fluid seal with the inner surface of the composite pipe 202A and the inner surface of the composite pipe 202B, while concomitantly resisting deformation of both pipes from the radially compressive forces applied by the slips.

Each of the components of the connector 200, namely the service end 204, the first slip 210A, the slip nut 212, the second slip 210B, and the double seal carrier 220, can be constructed from either metallic materials, composite materials, thermoplastic materials, elastomers, or combinations thereof.

FIGS. 14 and 15 illustrate an alternative embodiment of the end connector of the present invention. The end connector 300 includes similar components as the end connector 100 illustrated in FIGS. 5-10C, namely a service end 108, a slip 110, and a slip nut 112. The end connector 300, however, does not require a seal carrier to provide a fluid seal between the end connector and the composite pipe. Instead, a generally annular, integral seal 302 is positioned at the end of the composite pipe 102 to provide the primary fluid seal between the service end 108 and the composite pipe 102.

The integral seal 302 is formed by folding a portion of the interior liner 106 of the composite pipe 102 radially outward. In this manner, a radially extending first seal surface 304 is formed for engaging a radially extending surface 306 of the service end 108 in a sealing relationship. A gasket 308 can be interposed between the first seal surface 304 and the surface 306 of the service end 108 to enhance the seal. The integral seal 302 also includes a second radially extending surface 310 that contacts and seals the end of the composite layer 104.

The annular seal 302 can be formed by removing the outer layers of the composite pipe 102, such as composite layer 104, to expose a portion of the interior liner 106 at the end of the pipe. The exposed portion of the liner 106 can then be heated until the liner becomes pliable. In the case of a liner formed from a polymer material, such as a thermoplastic, the liner can be heated to a softening temperature which is less than the melt temperature of the thermoplastic. Once pliable, the exposed portion of the liner can be folded to form the integral seal 302. By heating the end of the composite layer 104, the integral seal 302 can coalesce with the polymer matrix of the composite layer 104 to provide a fluid impervious connection between surface 310 of the integral seal 302 and the end of the composite layer 104.

The integral seal 302 can be formed from layers other than the interior liner 106 of the composite pipe. Any layer, including any composite layers, can be folded radially outward to form the seal 302. Alternatively, an outer layer of the composite pipe can be folded radially inward to form the integral seal 302. To provide the most effective seal, however, it is preferable for the either innermost or the outermost layer of the composite pipe to be used. In this manner delamination of any exposed layers of the pipe, i.e., layers not encompassed by the integral seal, will be inhibited.

Moreover, the integral seal 302 need not be formed with a radially extending seal surface 304. The seal surface 304, as well as the mating surface 306 of the service end, can be oriented at angles other than perpendicular to the longitudinal axis of the composite pipe. The seal surface 304 can be any angle from 0° to 180° relative to the longitudinal axis of the composite pipe.

An alternative embodiment of the pipe-to-pipe connector of the present invention is illustrated in FIGS. 16 and 17. The pipe-to-pipe connector 400 includes similar components as the pipe-to-pipe connector 200 illustrated in FIGS. 11 and 12, namely, a service end 204, a first slip 210A, a slip nut 212, and a second slip 210B. Connector 400 does not, however, require a double seal carrier to provide a fluid seal between the first and second composite pipes. Instead, first and second integral seals 402A and 402B are provided at the respective ends of the first and second composite pipes 202A and 202B to provide fluid seals between the composite pipes.

The integral seals 402A and 402B can be formed in a manner analogous to integral seal 302, described above. A layer of the composite pipe can folded radially outward or inward to provide a sealing surface. The first integral seal 402A has a radially extending first seal surface 404A. The second integral seal 402B has a radially extending second seal surface 404B.

Prior to assembly of the pipe ends, the integral seals 402A and 402B can be bonded or welded together by heating and joining the first and second seal surfaces such that the first seal surface 404A coalesces with the second seal surface 404B. In this manner a fluid impervious seal can be established between the first and second composite pipes. A reinforcing ring 406 can be provided at the interface between the first seal surface 404A and the second seal surface 404B to inhibit radial separation of the seal surfaces due to internal fluid pressure within the composite pipes.

It is not, however, necessary for the first integral seal 402A to be bonded or welded to the second integral seal 402B to provide an effective fluid seal between the integral seals. The mating engagement of the service end 204 and the slip nut 212, together with the radial compressive force provided by the first and second slips 210A and 210B, can be sufficient to maintain the first and second sealing surfaces 404A and 404B in a sealing relationship. In addition a gasket can be provided between the integral seals 402A and 402B to improve the effectiveness of the fluid seal at the interface of the integral seals.

A further alternative embodiment of the pipe-to-pipe connector of the present invention is illustrated in FIGS. 18 and 19. The pipe-to-pipe connector 450 includes similar components as the pipe-to-pipe connector 200 illustrated in FIGS. 11 and 12, namely, a service end 204, a first slip 210A, a slip nut 212, and a second slip 210B. Connector 450 does not, however, require a double seal carrier to provide a fluid seal between the first and second composite pipes. Instead, the end 454A of the first composite pipe 202A and the end 454B of the second composite pipes 202B provide the fluid seal between the composite pipes.

The composite pipe ends 454A and 454B are preferably formed such that the end of each layer forming the composite pipe is flush, i.e., the ends of the layers cooperatively form a continuous planar surface. In this manner, the ends 454A and 454B can provide effective sealing surfaces with which to join the composite pipes.

Prior to assembly of the pipe ends, the composite pipe ends 454A and 454B can be bonded or welded together by heating and joining the ends such that the first end 454A coalesces with the second end 454B. In this manner a fluid impervious seal can be established between the first and second composite pipes. A reinforcing ring 406 can be provided at the interface between the first seal surface 404A and the second seal surface 404B to inhibit radial separation of the seal surfaces due to internal fluid pressure within the composite pipes.

It is not, however, necessary for the first end 454A to be bonded or welded to the second integral seal 454B to provide an effective fluid seal between the composite pipes. The mating engagement of the service end 204 and the slip nut 212, together with the radial compressive force provided by the first and second slips 210A and 210B, can be sufficient to maintain the first and second composite pipe ends 454A and 454B in a sealing relationship. In addition, a gasket 452 can be provided between the ends 454A and 454B to improve the effectiveness of the fluid seal at the interface of the composite pipes.

Figure 20:
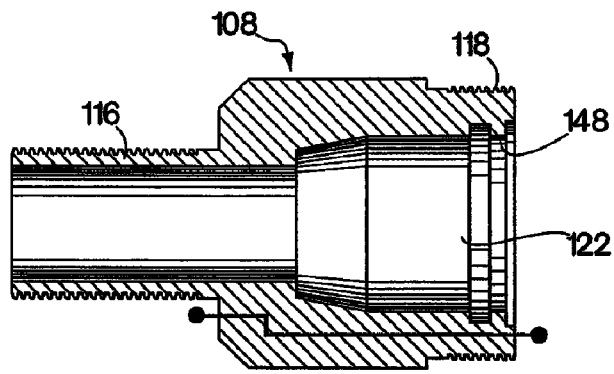
FIG. 20 is a side elevational view in cross-section of a service end of a connector of the present invention, illustrating an energy conductor embedded in the service end in accordance with the teachings of the present invention.
Figure 22:
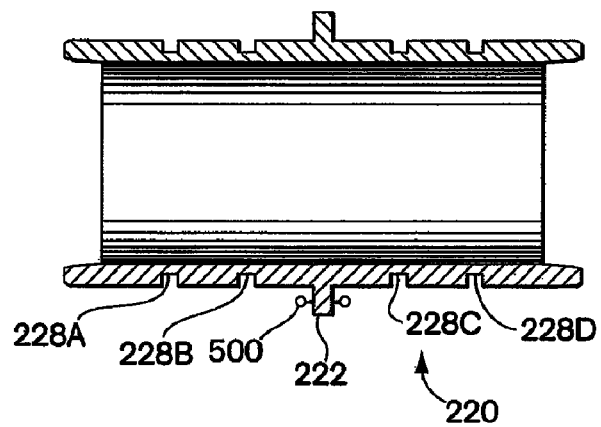
FIG. 22 is a side elevational view in cross-section of a double seal carrier of a pipe-to-pipe connector of the present invention, illustrating an energy conductor embedded in the double seal carrier in accordance with the teachings of the present invention.
Figure 25:
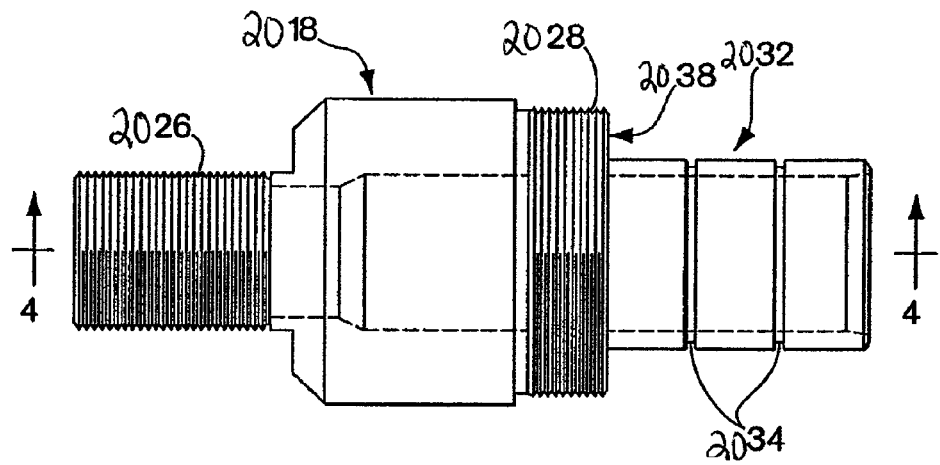
FIG. 25 is a side elevational view of the service end of the end connector of FIG. 23.

Each of the connector embodiments described herein can also include one or more energy conductors to permit connection of energy conductors mounted within the composite pipe to the energy conductors of a service member or the energy conductors of another composite pipe. For example, FIG. 20 illustrates the service end 108 of the end connector illustrated in FIG. 5 including an energy conductor 500 embedded within, i.e. surrounded by a material of, the service end 108. FIG. 22 illustrates an energy conductor 500 embedded in the annular shoulder 222 of a double seal carrier 220 for a pipe-to-pipe connector. The energy conductor 500 can be an electric medium, such as a copper wire, an optical medium, such as an optical fiber, a hydraulic medium, a pneumatic medium or any material or substance capable of being modulated with data signals or power. The energy conductor 500 provides structure to connect the energy conductors of the composite pipe to the energy conductors of a service member, in the case of an end connector, or the energy conductors of another composite pipe, in the case of a pipe-to-pipe connector. Composite pipes including energy conductors are described in commonly assigned U.S. Pat. No. 5,921,285 and commonly assigned U.S. No. 6,004,639, each of which are expressly incorporated by reference herein in their entireties.

Referring to FIGS. 23 and 24, an end connector 2010 according to the present invention provides for the attachment of a composite pipe 2012 to a service member (not shown), such as a logging tool, or t-fitting in a pipeline. The composite pipe 2012 includes at least one composite layer 2014 of fibers embedded in a polymer matrix and preferably includes a substantially fluid impervious interior liner 2016 disposed concentrically within the composite layer 2014. Although only one composite layer is illustrated and described herein, one skilled in the art will appreciate that the composite pipe 2012 can include multiple composite layers depending on the application and service in which the composite pipe is to be used. The principal components of the end connector 2010 include a service end 2018, a slip 2020, and a slip nut 2022.

Referring to FIGS. 23-26, the service end 2018 includes a first coupling surface 2026 at a first end 2024 thereof for connecting the pipe 2012 with a service member and a second coupling surface 2028 proximate the midpoint between the first end 2024 and the second end 2030 of the service end 2018. The second coupling surface 2028 provides for the connection of the service end 2018 with the slip nut 2022 and, thus, the assembly of the service end 2018 to the pipe 2012. The first and second coupling surfaces 2026 and 2028 can be threaded as illustrated or can be provided with alternative mechanisms for attaching the service end to the service member or the pipe. The service end 2018 includes a generally tubular housing bore 2031 having an inner diameter that is preferably equal to, or slightly less than, the inner diameter of the composite pipe 2012.

The second end 2030 of the service end 2018 includes an integral seal carrier 2032. The integral seal carrier 2032 is generally cylindrical in shape and is sized to be received within the bore of the composite pipe 2012, as shown in FIGS. 23 and 24. Preferably, the outer diameter of the integral seal carrier 2032 is equal to, or slightly less than, the inner diameter of the composite pipe 2012 such that the integral seal carrier 2032 can be received within the bore of the composite pipe 2012 in a substantially friction-tight fit. Annular grooves 2034 are formed in the outer surface of the seal carrier 2032 to receive seal members 2036, such as elastomeric O-rings, for providing a seal between the integral seal carrier 2032 and the composite pipe 2012. One skilled in the art will recognize that additional seal members or a single seal member may be used depending on the integrity of the fluid seal desired. A radially extending surface 2038 extends radially outward from the outer surface of the seal carrier 2032 to form an annular shoulder for engaging the end of the composite pipe 2012, as well as an end of the slip 2020, when the end connector 2010 is coupled to the composite pipe 2012.

The service end 2018, including the integral seal carrier 2032, is preferably of single piece, unitary construction. A significant advantage of the end connector of the present invention is that, unlike conventional end connectors, the end connector 2010 of the of the present invention does not require are separate, discrete seal carrier to provide a fluid seal between the end connector and the composite pipe and/or a separate load support member to inhibit deformation of the composite pipe 2012 from the slip 2020. The service end 2018, including the integral seal carrier 2032, provides both of these functions.

Referring to FIGS. 23, 24, and 29A-31, the slip 2020 is generally cylindrical in shape and is sized to fit about the outer surface of the composite pipe 2012. The slip 2020 includes a tapered outer surface 2040 that tapers from an increased diameter at a first end 2044 to a reduced diameter at a second end 2046. A longitudinal slot 2042 is formed in the slip 2020 to permit radial compression of the slip 2020. The slip 2020 can also be formed in multiple sections to permit radial compression. Pipe-engaging teeth 2050 are formed on the inner surface of the slip 2020. The teeth 2050 are sized and shaped to fully embed into the outer surface of the composite pipe 2012. The teeth 2050 can be arranged in longitudinally, circumferentially, and/or helically spaced rows. In one preferred embodiment, illustrated in FIG. 29B, the teeth are arranged in helically spaced rows oriented at approximately 45° to the longitudinal axis of the composite pipe. Applicants determined that this particular orientation of the teeth provides increased resistance to external torque exerted on the connector.

Figure 31:
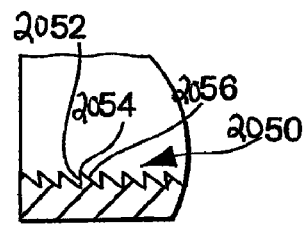
FIG. 31 is a detailed elevational view of the teeth of the slip of FIGS. 29A, 29B.
Figure 29B:
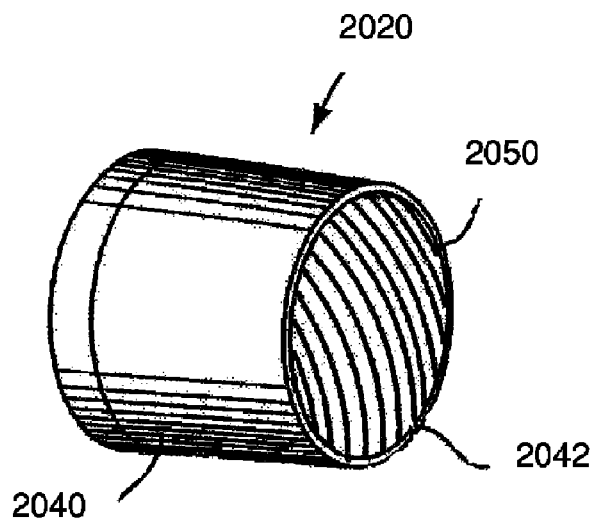

Each row of teeth preferably includes a generally radially extending surface 2052 that intersects with an angled surface 2054 to form a sharp point 2056, as best illustrated in FIG. 31. Preferably, the entire surface of each tooth, i.e. the radially extending surface 2052 and the angled surface 2054, is engaged with the fibers and the polymer resin forming the composite layer 2014 of the pipe 2012. In this manner, the teeth 2050 permit the transfer of loads into the composite layer 2014 of the composite pipe 2012.

Alternatively, the slip 2020 can be provided with teeth sized, shaped, and arranged in a manner analogous to the teeth of the slip of the end connector described in commonly-assigned U.S. Pat. No. 5,988,702, expressly incorporated by reference herein in its entirety.

Figure 27:
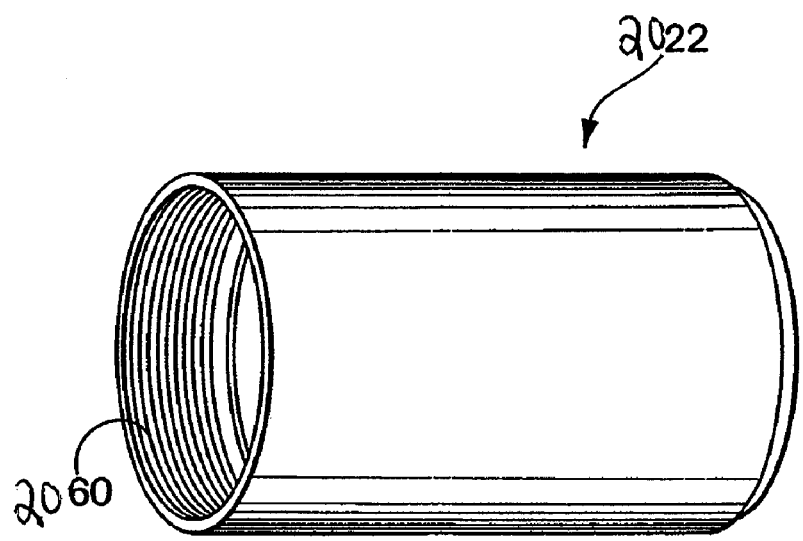
FIG. 27 is a perspective view of the slip nut of the end connector of FIG. 23.
Figure 28:
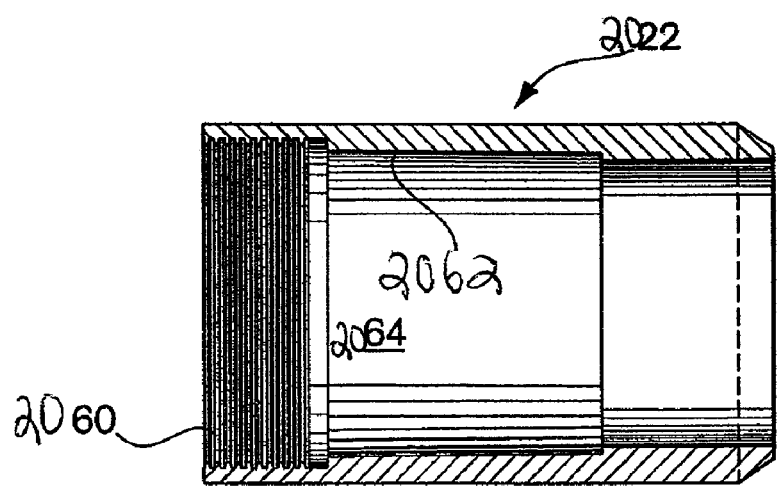
FIG. 28 is a side elevational view in cross-section of the slip nut of FIG. 27.
Figure 29A:
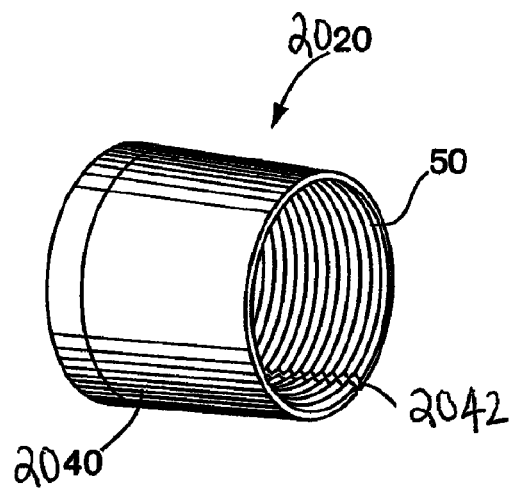
FIGS. 29A and 29B are perspective views of the slip of the end connector of FIG. 23.
Figure 30:
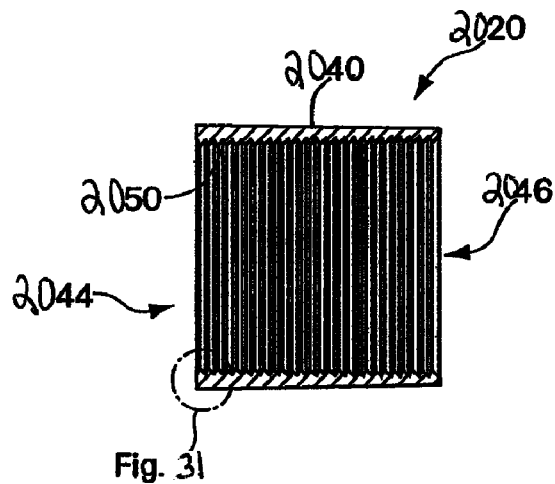
FIG. 30 is a side elevational view in cross section of the slip of FIGS. 29A, 29B.

Continuing to refer to FIGS. 23 and 24, and referring specifically to FIGS. 27 and 28, the slip nut 2022 is generally cylindrical in shape and is provided with a threaded coupling surface 2060 formed on the inner surface thereof. The inner bore 2064 of the slip nut 2022 includes a centrally located tapered surface 2062 for engaging the outer surface 2040 of the slip 2020 when the end connector 2010 is coupled to the pipe 2012. The inner bore 2064 is sized to permit the slip nut 2022 to be positioned about the outer surface of the composite pipe 2012.

Figure 26:
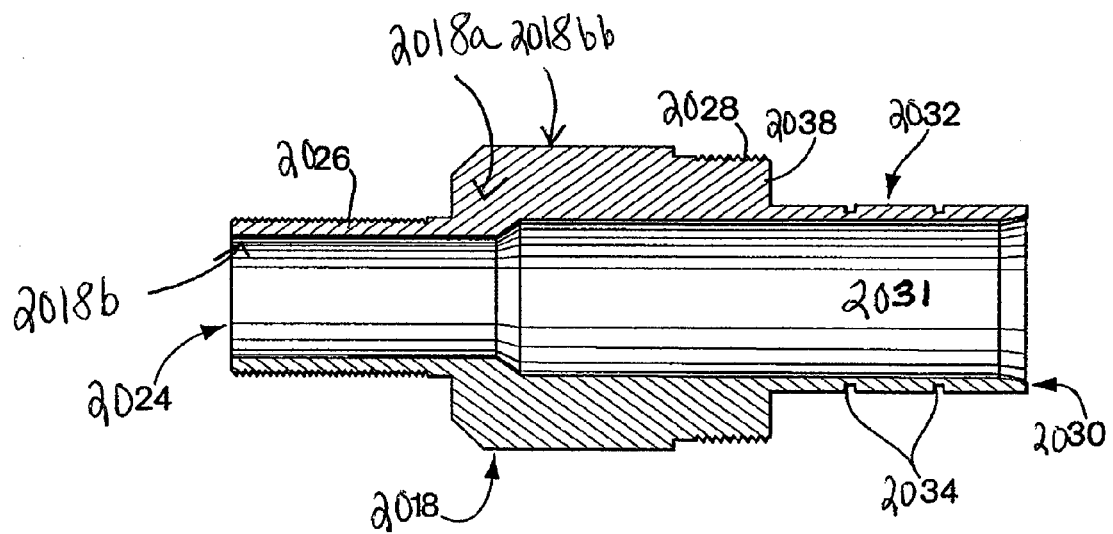
FIG. 26 is a side elevational view in cross-section of the service end of FIG. 25.

Each of the components of the end connector 2010, namely the service end 2018, the slip 2020, and the slip nut 2022 can be constructed from either metallic materials, composite materials, thermoplastics, elastomers, or combinations thereof. In one preferred embodiment, as shown in FIG. 26, the components of the end connector 2010, in particular the service end 2018, can be constructed of a metallic material 2018a coated with a corrosion resistant material 2018b, 2018bb, such as, for example, epoxy.

When assembled, the slip nut 2022 is slid over the outer surface of the composite pipe 2012. The slip 2020 is positioned about the composite pipe 2012 and within a recess formed between the outer surface of the pipe and tapered surface 2062 of the slip nut 2022. The integral seal carrier 2032 of the service end 2018 is positioned within the bore of the composite pipe 2012 such that the shoulder formed by radially extending surface 2038 abuts the end of the composite pipe 2012. The slip nut 2022 is coupled to the service end 2018 by threaded engagement of the second coupling surface 2028 and the threaded coupling surface 2060 of the slip nut. During coupling, the service end 2018 and the slip nut 2022 move axially towards one another and the tapered surface 2062 of the slip nut 2022 engages the tapered outer surface 2040 of the slip 2020. Once the first end 2044 of the slip 2020 abuts the radially extending surface 2038 of the service end 2018, as best illustrated in FIG. 24, the engaging action of the tapered surface 2062 on the slip 2020 acts to radially compress the teeth 2050 of the slip 2020 into engagement with the outer surface of the composite pipe 2012.

Preferably, the service end 2018 is positioned such that the annular groves 2034 of the integral seal carrier 2032, and the seal members 2036, are positioned radially opposite the slip 2020 when the end connector 2010 is coupled to the composite pipe 2012, as illustrated in FIGS. 23 and 24. By positioning the integral seal carrier 2032 in this manner, the integral seal carrier 2032 can establish a fluid seal with the bore of the composite pipe 2012 while concomitantly resisting deformation of the pipe from the radially compressive forces applied by the slip 2020. Thus, in contrast to conventional connector embodiments, the end connector 2010 of the present invention does not require a separate seal carrier to provide a fluid seal or a separate load support member to inhibit deformation of the composite pipe 2012. The integral seal carrier 2032 of the service end 2018 provides these functions. Additionally, in this arrangement, the radially compressive force from the slip 2020 can operate to increase the sealing relationship between the seal members 2036 and the bore of the composite pipe 2012.

Figure 32:
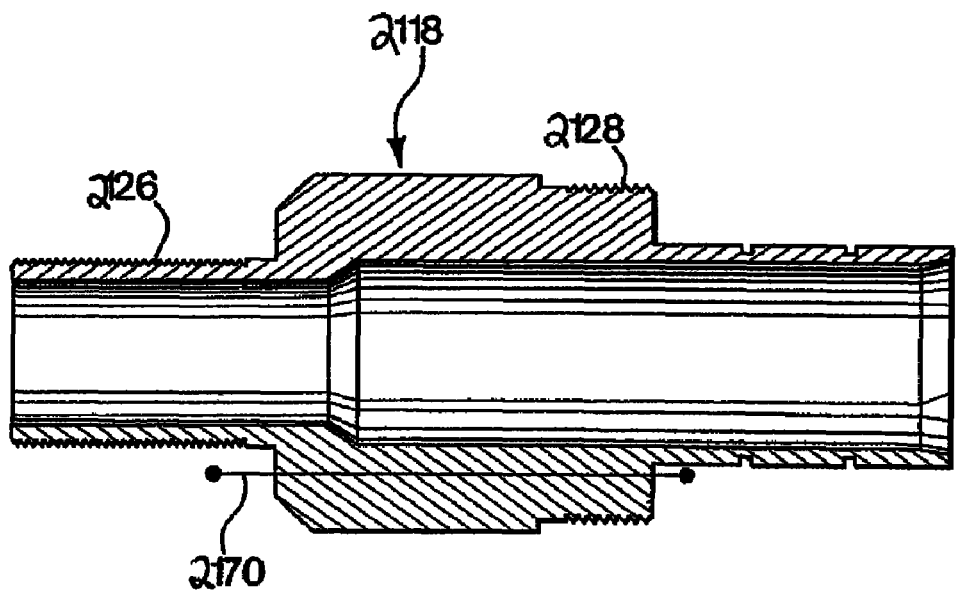
FIG. 32 is a side elevational view in cross-section of an alternative embodiment of the service end of a connector of the present invention, illustrating an energy conductor embedded in the service end in accordance with the teachings of the present invention.

The end connector of the present invention can also include one or more energy conductors to permit connection of energy conductors mounted within the composite pipe to the energy conductors of a service member or the energy conductors of another composite pipe. For example, FIG. 32 illustrates a service end 2118 including an energy conductor 2170 embedded in, i.e. surrounded by a material of, the service end 2118. The energy conductor 2170 can be an electric medium, such as a copper wire, an optical medium, such as an optical fiber, a hydraulic medium, a pneumatic medium or any material or substance capable of being modulated with data signals or power. The energy conductor 2170 provides structure to connect the energy conductors of the composite pipe to the energy conductors of a service member. Composite pipes including energy conductors are described in commonly assigned U.S. Pat. No. 5,921,285 and commonly assigned U.S. Pat. No. 6,004,639, each of which are expressly incorporated by reference herein in their entireties.

In embodiments, the end connector can include one or more openings or conduits to permit connection of energy conductors mounted within the composite pipe to energy conductors of a service member and/or energy connectors of another composite pipe. The conduits can isolate energy conductors from the environmental conditions (such as pressure and/or temperature) of the interior of the composite pipe. In one such embodiment, the end connector can include a conduit and an energy conductor of a composite pipe can be passed through the conduit to a service member.

Figure 33B:
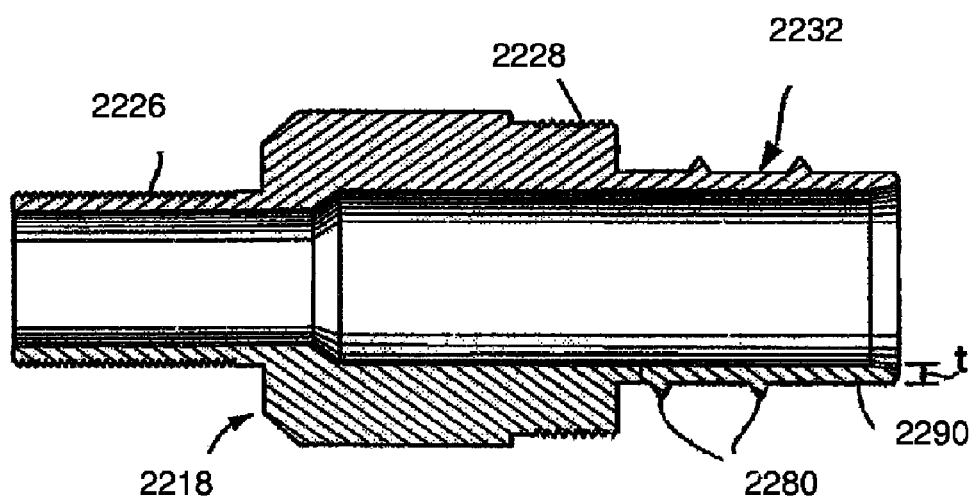
FIGS. 33A and 33B are side elevational views in cross-section of an alternative embodiment of the service end of an end connector of the present invention, illustrating raised annular ridges formed on the service end in accordance with the teachings of the present invention.
Figure 33A:
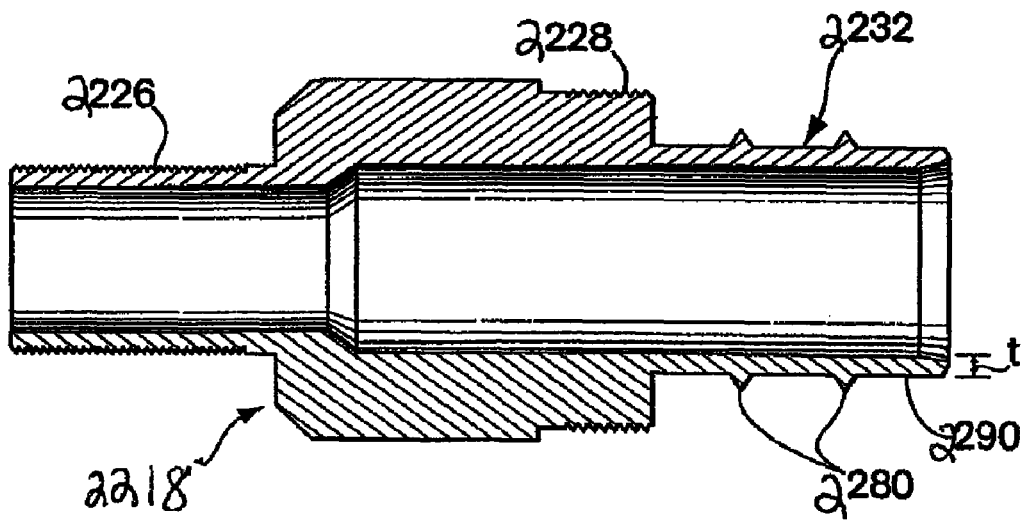

An alternative embodiment of the service end 2218 is illustrated in FIGS. 33A-33B, in which the annular grooves and the seal members of the integral seal carrier 2232 are replaced with raised, barb-like, ridges 2280. The ridges 2280 can be generally triangular in cross-section to form a sharpened point for embedding into the inner layer, such as the interior liner, of the composite pipe. The ridges 2280 can also have other cross-sectional shapes sufficient for the ridges to embed in the inner layer of the composite pipe. The ridges 2280 can alternatively be spiral oriented threads, as shown in FIG. 33B, or circular oriented threads, as shown in FIG. 33A. The raised ridges 2280 eliminate the need for separate seal members, which can wear during use resulting in fluid leakage. Also, because grooves need not be formed in the seal carrier, the thickness of the wall 2290 of the integral seal carrier 2232, indicated by arrow t in FIGS. 33A, 33B, can be reduced. This reduction in thickness allows the inner diameter of the integral seal carrier 2232 to more closely match the inner diameter of the composite pipe thereby minimizing flow disruptions and turbulence of the fluid within the pipe at the interface of the seal carrier and the composite pipe.

It should be understood that the component parts of the embodiments of FIGS. 32 and 33A, 33B, respectively, are similar to those previously described herein, and accordingly the same reference numerals are used to designate similar parts although the numerals are incrementally increased by 100 to differentiate the embodiments described herein.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. A connector for attaching a composite pipe to a service member, the composite pipe including at least one composite layer of fibers, the connector comprising:
    a service end having a first coupling surface for connecting the pipe with the service member and a second coupling surface for assembling the service end with the pipe,
    a slip nut disposed about the outer surface of the pipe and engageable with the second coupling surface on the service end,
    a slip having multiple sections, positioned about the outer surface of the pipe and engaged by the service end and the slip nut to compress the slip into gripping contact with the pipe upon progressive engagement of the service end with the slip nut, the slip having teeth formed on the inner surface thereof for engaging the outer surface of the pipe,
    a seal carrier positioned in a bore of the pipe when the connector is coupled to the pipe, the seal carrier positioned in the bore of the pipe at a location radially opposite the slip to resist deformation of the pipe when the slip is compressed into gripping contact with the pipe, the seal carrier having a seal thereon to seal between the bore of the pipe and the seal carrier, and
    an energy conductor for connection with a first energy conductor within the composite pipe and a second energy conductor within the service member, wherein the energy conductor is at least one of an electrical medium, an optical medium, a hydraulic medium, and a pneumatic medium, wherein a first end of the energy conductor is external to the first coupling surface of the service end for connection with the second energy conductor within the service member, and a second end of the energy conductor is external to the second coupling surface of the service end for connection with the first energy conductor within the composite pipe.

2. The connector of claim 1, wherein the seal carrier is removeably and replaceably positionable within a bore of the service end.

3. The connector of claim 1, wherein the seal carrier and the service end are of unitary construction.

4. The connector of claim 1, wherein the slip includes a longitudinal slot to facilitate embedding of the teeth of the slip into the pipe.

5. The connector of claim 1, wherein a recess is formed in the slip nut, the recess being configured to matingly receive the slip and to engage and move the slip into gripping contact with the pipe when the slip nut is engaged with the service end.

6. The connector of claim 5, wherein the slip nut includes a conically tapered surface defining the recess in the slip nut, the conically tapered surface engaging the slip to compress the slip into gripping contact with the pipe.

7. The connector of claim 1, wherein the teeth of the slip are arranged in longitudinally spaced rows.

8. The connector of claim 1, wherein the teeth of the slip are arranged in helical rows oriented at approximately 45.degree. to the longitudinal axis of the composite pipe.

9. The connector of claim 1, wherein the teeth are arranged in longitudinally and circumferentially spaced rows.

10. The connector of claim 1, wherein the teeth have a substantially radially extending surface.

11. The connector of claim 1, wherein the service end is of unitary construction.

12. The connector of claim 1, wherein the service end is constructed from at least one of metallic materials, thermoplastic materials, and composite materials.

13. The connector of claim 1, wherein the service end is constructed from metallic materials coated with a corrosion resistant material.

14. The connector of claim 1, wherein the seal carrier is of unitary construction.

15. The connector of claim 1, wherein the seal carrier is constructed from at least one of metallic materials, thermoplastic materials, and composite materials.

16. The connector of claim 1, wherein the teeth are sized and shaped to penetrate into an outer layer of the pipe.

17. The connector of claim 1, wherein the seal carrier includes at least one annular groove formed thereon for carrying an annular seal.

18. The connector of claim 17, further comprising an annular seal positioned within the annular groove.

19. The connector of claim 17, wherein the annular groove is positioned at a location radially opposite the slip.

* * * * *